United States Patent
Fox et al.

(10) Patent No.: US 11,460,861 B2
(45) Date of Patent: Oct. 4, 2022

(54) CLOUD BASED ROBOTIC CONTROL SYSTEMS AND METHODS

(71) Applicant: Indiana University Research and Technology Corporation, Indianapolis, IN (US)

(72) Inventors: Geoffrey C. Fox, Bloomington, IN (US); Supun M. Kamburugamuve Loku Acharige, Bloomington, IN (US)

(73) Assignee: INDIANA UNIVERSITY RESEARCH AND TECHNOLOGY CORPORATION, Indianapolis, IN (US)

( * ) Notice: Subject to any disclaimer, the term of this patent is extended or adjusted under 35 U.S.C. 154(b) by 326 days.

(21) Appl. No.: 16/486,104

(22) PCT Filed: Feb. 16, 2018

(86) PCT No.: PCT/US2018/000013
§ 371 (c)(1),
(2) Date: Aug. 14, 2019

(87) PCT Pub. No.: WO2018/160267
PCT Pub. Date: Sep. 7, 2018

(65) Prior Publication Data
US 2020/0233436 A1    Jul. 23, 2020

Related U.S. Application Data

(60) Provisional application No. 62/459,967, filed on Feb. 16, 2017.

(51) Int. Cl.
| | |
|---|---|
| *G05D 1/02* | (2020.01) |
| *B60W 60/00* | (2020.01) |
| *G05D 1/00* | (2006.01) |
| *H04L 67/1001* | (2022.01) |
| *H04L 67/125* | (2022.01) |
| *H04L 67/562* | (2022.01) |
| *H04L 67/565* | (2022.01) |

(52) U.S. Cl.
CPC ......... *G05D 1/0291* (2013.01); *B60W 60/001* (2020.02); *G05D 1/0088* (2013.01);
(Continued)

(58) Field of Classification Search
CPC .. G05D 1/0291; G05D 1/0088; G05D 1/0289; G05D 2201/02; G05D 1/0274;
(Continued)

(56) References Cited

U.S. PATENT DOCUMENTS

| | | |
|---|---|---|
| 8,639,644 B1 | 1/2014 | Hickman et al. |
| 2016/0023351 A1 | 1/2016 | Kuffner et al. |

(Continued)

OTHER PUBLICATIONS

International Search Report and Written Opinion issued by the ISA/US, Commissioner for Patents, dated Nov. 5, 2018, for International Application No. PCT/US2018/000013.
(Continued)

*Primary Examiner* — Donald J Wallace
(74) *Attorney, Agent, or Firm* — Faegre Drinker Biddle & Reath LLP

(57) ABSTRACT

A method of controlling an operation of a robot (102) is provided using a cluster of nodes (104) in a network (106). The method includes receiving, using a gateway cloud driver (108), robot state information from the robot (102) via the network (106), and converting, using the gateway cloud driver (108), the robot state information into at least one message. The method further includes transmitting, using a message broker (110), the at least one message to the cluster of nodes (104) via the network (106). The method further includes processing, using the cluster of nodes (104) in the network (106), the at least one message by parallel computing, and generating, using the cluster of nodes (104) in the network (106), a robot command to control the operation of the robot (102).

36 Claims, 18 Drawing Sheets

(52) U.S. Cl.
    CPC ....... *G05D 1/0289* (2013.01); *H04L 67/1002* (2013.01); *H04L 67/125* (2013.01); *H04L 67/2809* (2013.01); *H04L 67/2823* (2013.01); *B60W 2554/4042* (2020.02); *B60W 2554/4043* (2020.02); *B60W 2556/45* (2020.02)

(58) Field of Classification Search
    CPC ................ G05D 1/024; B60W 60/001; B60W 2554/4042; B60W 2556/45; B60W 2554/4043; H04L 67/1002; H04L 67/125; H04L 67/2809; H04L 67/2823; G05B 2219/40174; B25J 9/161
    See application file for complete search history.

(56) References Cited

U.S. PATENT DOCUMENTS

| | | | |
|---|---|---|---|
| 2016/0198000 A1 | 7/2016 | Gorshechnikov et al. | |
| 2017/0286916 A1* | 10/2017 | Skiba | G06Q 10/1097 |
| 2017/0295109 A1* | 10/2017 | Byers | H04Q 1/025 |

OTHER PUBLICATIONS

International Preliminary Report on Patentability received for PCT Patent Application No. PCT/US2018/000013, dated Aug. 29, 2019, 8 pages.

* cited by examiner

A. Configuration of two robots

B. Velocity obstacle $VO_{A|B}$

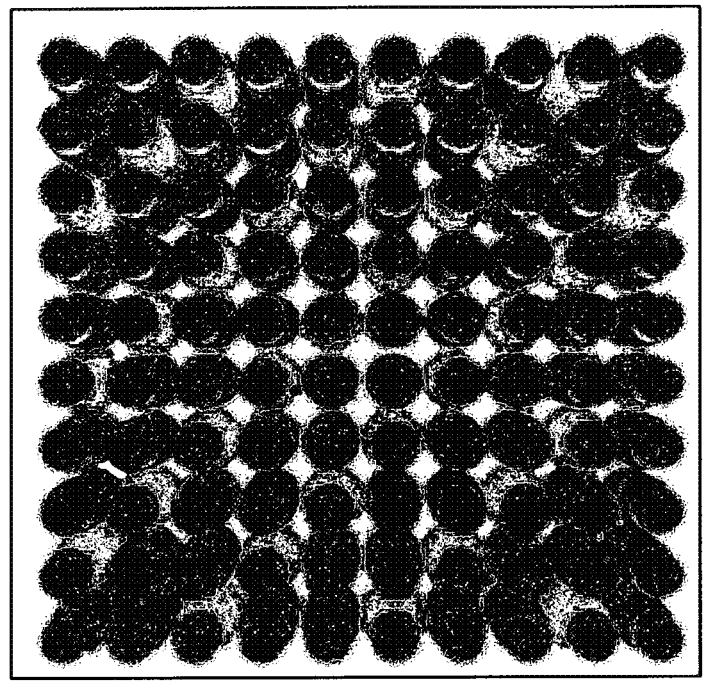
FIG. 10
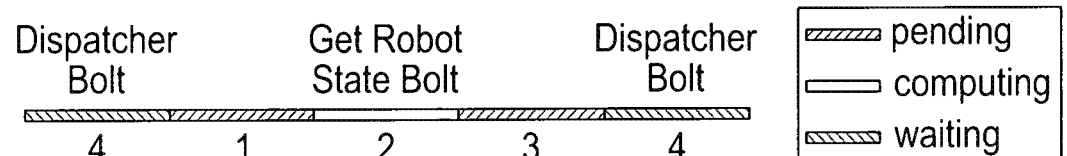
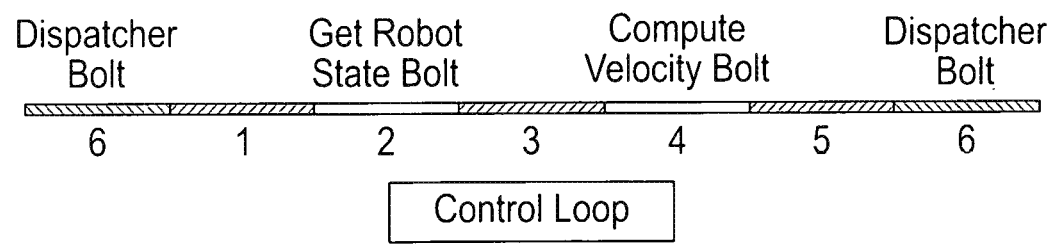
FIG. 11

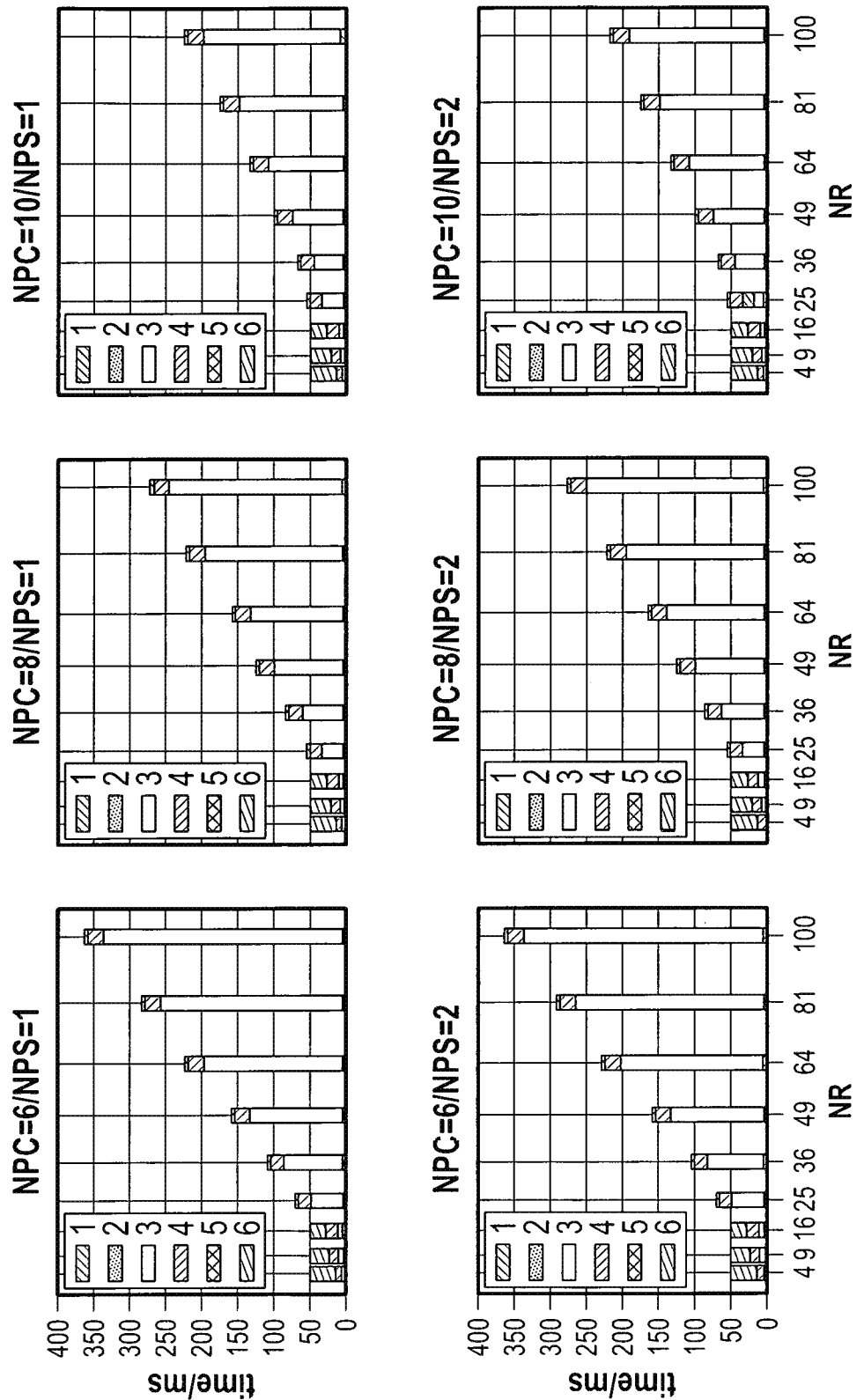
FIG. 12a Control Loop Time Consumptions

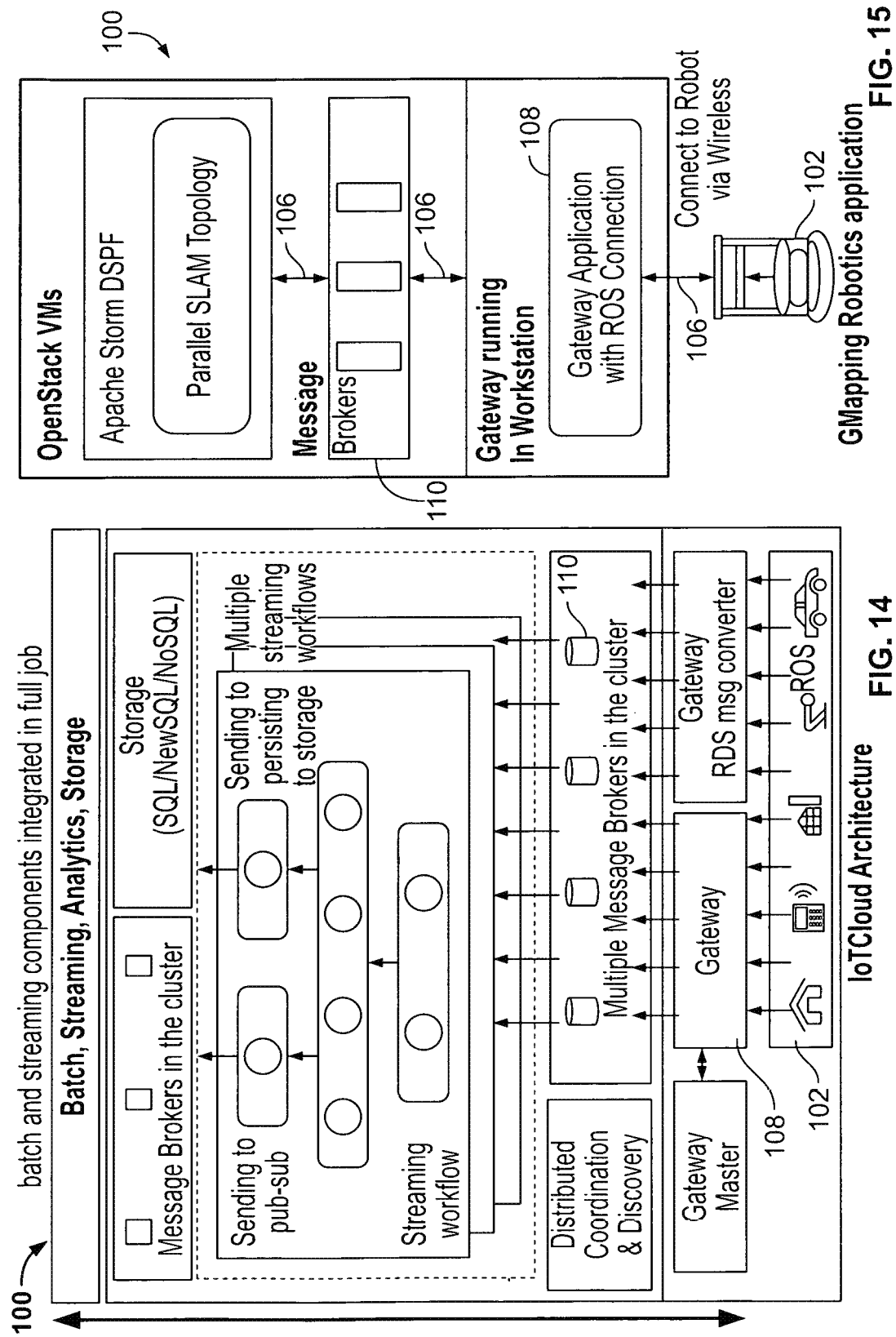
FIG. 14 IoTCloud Architecture
FIG. 15 GMapping Robotics application

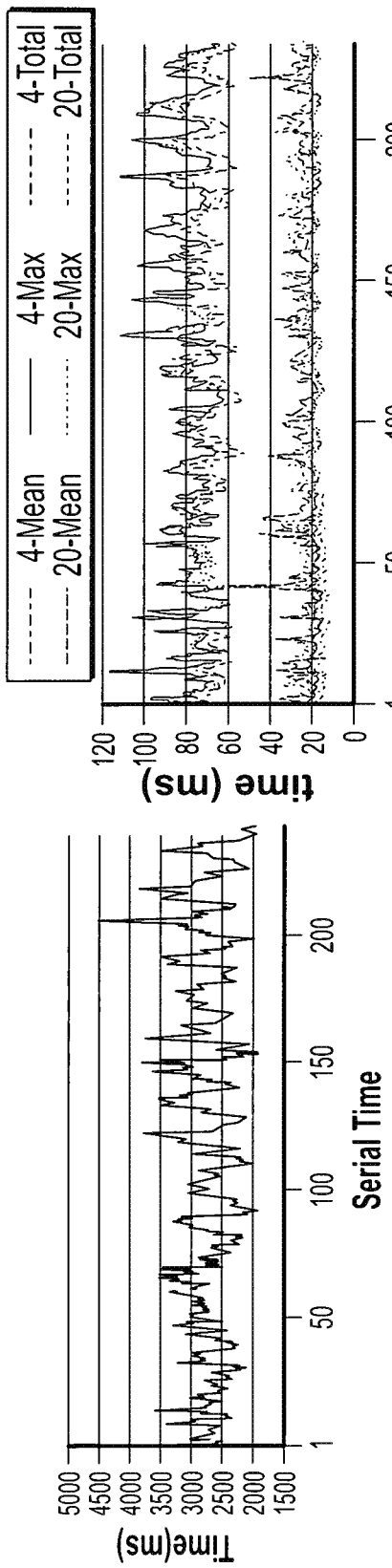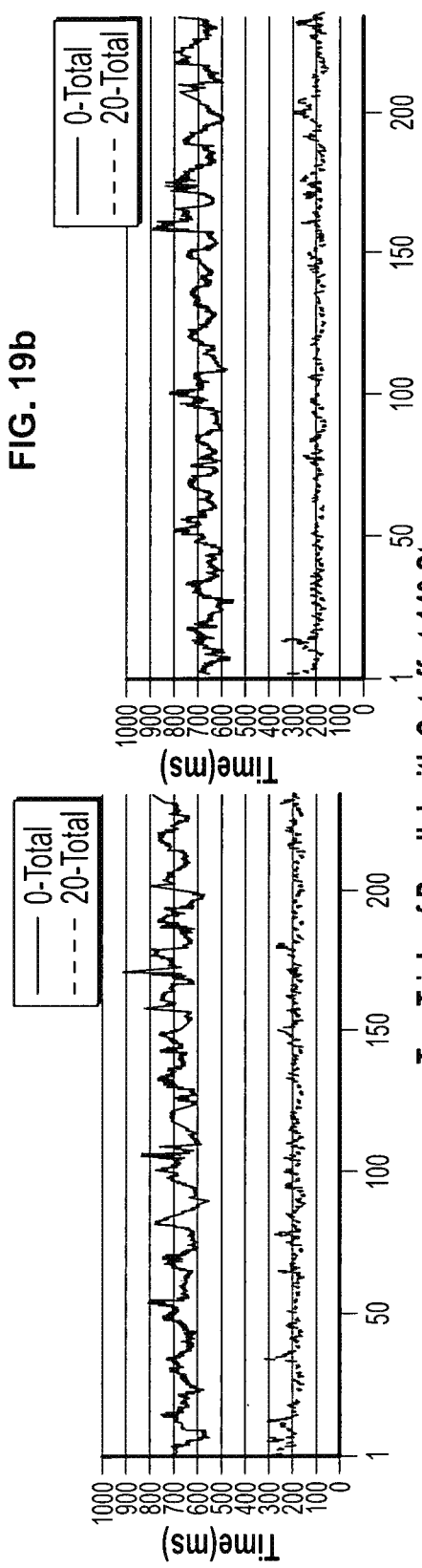
FIG. 19a — Serial Time
FIG. 19b — Parallel without cutoff
FIG. 19c — Two Trials of Parallel with Cutoff at 140 Steps

CLOUD BASED ROBOTIC CONTROL SYSTEMS AND METHODS

CROSS-REFERENCE TO RELATED APPLICATIONS

The present application is a U.S. national stage under 35 U.S.C. 371 of International Application No. PCT/US2018/000013, filed on Feb. 6, 2018, which claims the benefit of and priority to U.S. Provisional Application No. 62/459,967, filed on Feb. 16, 2017, and titled CLOUD BASED ROBOTIC CONTROL SYSTEMS AND METHODS, the entire disclosures of which are expressly incorporated by reference herein in their entireties.

This invention was made with government support under FA9550-13-1-0225 awarded by the Air Force Office of Scientific Research. The government has certain rights in the invention.

FIELD OF THE DISCLOSURE

The present disclosure generally relates to cloud computing systems and methods. More particularly, the present disclosure relates to systems and methods for controlling cloud based robotic systems and methods.

BACKGROUND OF THE DISCLOSURE

Nowadays, Cloud Computing has brought many new and efficient approaches for computation-intensive application areas. One typical area is Cloud based real-time device control system, such as the IoT Cloud Platform. This kind of platform shifts computation load from devices to the Cloud and provides powerful processing capabilities to a simple device. In Swarm robotics, robots are supposed to be small, energy efficient and low-cost, but still smart enough to carry out individual and swarm intelligence. These two goals are normally contradictory to each other. Besides, in real world robot control, real-time on-line data processing is required, but most of the current Cloud Robotic Systems are focusing on off-line batch processing. However, Cloud based real-time device control system may provide a way that leads this research area out of its dilemma. The present disclosure explores the availability of Cloud based real-time control of massive complex robots by implementing a relatively complicated but better performed local collision avoidance algorithm. The Cloud based application and corresponding Cloud driver, which connects the robot and the Cloud, are developed and deployed in Cloud environment. Simulation tests are carried out and the results show that, when the number of robots increases, by simply scaling computation resources for the application, the algorithm can still maintain the preset control frequency. Such characteristics verify that the Cloud Computing environment is a new platform for studying massive complex robots in swarm robotics.

Simultaneous Localization and Mapping (SLAM) for mobile robots is a computationally expensive task. A robot capable of SLAM needs a powerful onboard computer, but this can limit the robot's mobility because of weight and power demands. The present disclosure considers moving this task to a remote compute cloud, by proposing a general cloud-based architecture for real-time robotics computation, and then implementing a Rao-Blackwellized Particle Filtering-based SLAM algorithm in a multi-node cluster in the cloud. In our implementation, expensive computations are executed in parallel, yielding significant improvements in computation time. This allows the algorithm to increase the complexity and frequency of calculations, enhancing the accuracy of the resulting map while freeing the robot's onboard computer for other tasks. Our method for implementing particle filtering in the cloud is not specific to SLAM and can be applied to other computationally-intensive tasks.

Kehoe et al. summarize existing work and architectures for cloud robotics, and our architecture is similar to several of them. See, Kehoe, B., Patil, S., Abbeel, P., Goldberg, K.: A survey of research on cloud robotics and automation. IEEE Transactions on Automation Science and Engineering 12(2) (2015). A key difference is that we are proposing a generic streaming architecture coupled with other big data plat-forms to build applications. Hu et al. describe some of the challenges in cloud robotics such as communication constraints. See, Hu, G., Tay, W. P., Wen, Y.: Cloud robotics: architecture, challenges and applications. IEEE Network 26(3) (2012) 21-28. Chitchian et al. exploit multicore and GPU architectures to speed up particle filtering-based computations. See, Chitchian, M., van Amesfoort, A. S., Simonetto, A., Keviczky, T., Sips, H. J.: Particle filters on multi-core processors. Technical Report PDS-2012-001, Dept. Com-put. Sci., Delft Univ. Technology (2012)). Gouveia et al. create thread-based implementations of the GMapping algorithm with good performance gains. See, Gouveia, B. D., Portugal, D., Marques, L.: Speeding up Rao-blackwellized particle filter SLAM with a multi-threaded architecture. In: IEEE/RSJ International Conference on Intelligent Robots and Systems. (2014) 1583-1588. In contrast, our approach takes advantage of distributed environments with multiple multi-core machines. The C2TAM framework considers a similar problem of moving some of the expensive computation of SLAM to a cloud environment. See, Riazuelo, L., Civera, J., Montiel, J.: C2TAM: A Cloud framework for cooperative tracking and mapping. Robotics and Autonomous Systems 62(4) (2014) 401-413. They use a visual SLAM algorithm called Parallel Tracking and Mapping (PTAM) which uses a video camera. See, Klein, G., Murray, D.: Parallel tracking and mapping for small ar workspaces. In: IEEE and ACM International Symposium on Mixed and Augmented Reality. (2007) 225-234. In contrast to C2TAM, the present disclosure proposes a generic scalable real-time framework for computing the maps online with significant performance gains. Zhang et al. use the CUDA API to run part of GMapping (specifically the Scan Matching step) on GPUs to improve performance. See, Zhang, H., Martin, F.: CUDA accelerated robot localization and mapping. In: IEEE International Conference on Technologies for Practical Robot Applications. (2013) 1-6. Tosun et al. address particle filter-based localization of a vehicle with multicore processors. See, Tosun, O., et al.: Parallelization of particle filter based localization and map matching algorithms on multicore/manycore architectures. In: Intelligent Vehicles Symposium. (2011) 820-826. But neither of these is a multi-node cloud implementation. Gouveia et al. distribute the computation of GMapping among robots in the same environment. See, Portugal, D., Gouveia, B. D., Marques, L.: A Distributed and Multithreaded SLAM Architecture for Robotic Clusters and Wireless Sensor Networks. In: Cooperative Robots and Sensor Networks 2015. Springer (2015) 121-141. The present disclosure instead focuses on bringing this data to the cloud and processing it in a scalable and robust manner, exploiting (potentially) unlimited cloud resources.

As such, there are opportunities to develop an improved cloud based robotic control system and method that can enhance the performance and efficiency at reduced operating costs.

SUMMARY

In one embodiment of the present disclosure, a method of controlling an operation of a robot is provided using a cluster of nodes in a network. The method includes receiving, using a gateway cloud driver, robot state information from the robot via the network, and converting, using the gateway cloud driver, the robot state information into at least one message. The method further includes transmitting, using a message broker, the at least one message to the cluster of nodes via the network, processing, using the cluster of nodes in the network, the at least one message by parallel computing, and generating, using the cluster of nodes in the network, a robot command to control the operation of the robot.

In one example, the method further includes including, in the robot state information, at least one of: odometry information, scan information, and pose information associated with the robot.

In another example, the method further includes converting the robot state information into one or more custom-defined data types that can be processed by the message broker and the cluster of nodes.

In yet another example, the method further includes defining, using the gateway cloud driver, at least one cloud channel between the gateway cloud driver and the message broker for transmitting the at least one message to the cluster of nodes. In a variation, wherein defining the at least one cloud channel comprise creating the at least one cloud channel based on a type of the robot state information.

In still another example, the method further includes performing the processing of the at least one message by parallel computing in real time using the cluster of nodes in the network. In a variation, wherein performing the processing of the at least one message by parallel computing in real time comprises performing a scan matching process associated with the robot in parallel.

In yet still another example, the method further includes including, in the robot command, a motion command generated based on velocity obstacle information. In a variation, wherein including the motion command generated based the velocity obstacle information comprises publishing the motion command having at least one of: velocity information and pose information.

In a further example, the method further includes converting the robot command into a robot operation system (ROS) message, and transmitting the ROS message to the robot using the gateway cloud driver to control the operation of the robot.

In another embodiment of the present disclosure, a system of controlling an operation of a robot is provided using a cluster of nodes in a network. The system includes a gateway cloud driver configured to receive robot state information from the robot via the network, and configured to convert the robot state information into at least one message, and a message broker configured to communicate the at least one message between the cluster of nodes and the gateway cloud driver via the network. The cluster of nodes in the network is configured to process the at least one message by parallel computing; and also configured to generate a robot command to control the operation of the robot.

In one example, wherein the robot state information includes, at least one of: odometry information, scan information, and pose information associated with the robot.

In another example, wherein the gateway cloud driver is configured to convert the robot state information into one or more custom-defined data types that can be processed by the message broker and the cluster of nodes.

In yet another example, wherein the gateway cloud driver is configured to define at least one cloud channel between the gateway cloud driver and the message broker for transmitting the at least one message to the cluster of nodes. In a variation, wherein the gateway cloud driver is configured to create the at least one cloud channel based on a type of the robot state information.

In still another example, wherein the cluster of nodes in the network is configured to perform the processing of the at least one message by parallel computing in real time. In a variation, wherein the cluster of nodes in the network is configured to perform a scan matching process associated with the robot in parallel.

In yet still another example, wherein the cluster of nodes in the network is configured to generate a motion command, as a part of the robot command, based on velocity obstacle information. In a variation, wherein the cluster of nodes in the network is configured to publish the motion command having at least one of: velocity information and pose information.

In a further example, wherein the gateway cloud driver is configured to convert the robot command into a robot operation system (ROS) message, and transmit the ROS message to the robot to control the operation of the robot.

Since Cloud Computing can provide elastic, on demand, ubiquitous worldwide accessible computing and storage resources, it has been introduced into various areas from big data analysis to real-time robot control. One very promising area is developing a universal platform for real-time smart device control applications using Cloud Computing technology. The IoT (Internet of Things) Cloud is such a platform that provides real-time device control services. The IoT Cloud system is normally featured as both real-time responding and big data processing. As a large number of smart devices are connected to the Cloud, massive real-time stream data from these devices need to be analyzed and processed before they can be recorded in the database and processed offline by the Cloud. In some scenarios, such as robot control, the stream data from devices have to be processed and fed back in real time. These time-critical tasks require the system to respond fast enough. Thus, a batch analytic technique such as MapReduce is not viable for this kind of applications.

However, parallel processing ability and cluster computing framework techniques like MapReduce are very appealing, especially to systems that need to deal with a large number of computation-intensive entities. Swarm robotics is a typical research area that commonly deals with such systems. In swarm robotics, normally, the robot should be as small and energy efficient as possible, but still it needs to be able to perform the basic behaviors of an intelligent entity under research and can also carry out high level swarm intelligence. For a traditional robotic system, these two aspects are mutually exclusive. But with the help of Cloud Computing, most of the computation can be offloaded to the Cloud and, by utilizing elastic Cloud Computing, the number of robots in a swarm can scale flexibly. As most of the computation is transferred into the Cloud, the onboard system of a robot can be greatly reduced, keeping only sensors, communication and actuation modules, and leaving all high level algorithms to the Cloud. Motivated by such demand, several Cloud platforms dedicated to robotic control have been designed. Nevertheless, most of these systems mainly focus on static data processing, such as object recognition, path planning and so on. These tasks are not strictly time-critical as such dynamic tasks like local collision avoidance.

The IoT Cloud Platform, developed on a real-time distributed processing framework, is a scalable real-time stream data processing system. This platform is much more suitable for time-critical applications as it processes stream data for real-time response. The core of the IoT Cloud is a distributed real-time stream computing engine. Data from devices or databases can be injected into the engine as streams and the computing logic running in the engine will continuously process the data and then emit results out. The computing engine utilizes cluster computing paradigm, which makes it easy to scale and also fault-tolerant.

The present disclosure explores the parallelism and scalability of the IoT Cloud Platform in real-time data processing by implementing multi-robot collision avoidance. Unlike other parallel algorithm research, the present disclosure focuses on entity or agent level parallelization and studies mainly computation resource scaling according to the computation load. And, unlike normal swarm robotic researchers that seek simplified models to reduce computation, the present disclosure implements a complicated algorithm that reflects in-depth details about the physical system and can be used in a real world scenario. The results of the experiment demonstrate that the IoT Cloud introduced in the present disclosure is an effective, scalable platform for swarm robotics. The main contribution of our research is exploring novel Cloud frameworks for implementation of computation-intensive algorithms in swarm robotics.

The Internet of Things (IoT) promises to bring Internet connectivity to devices ranging from simple thermostats to highly complex industrial machinery and robots. Many potential IoT applications involve analyzing the rich, large-scale datasets that these devices produce, but analytics algorithms are often computationally expensive, especially when they have to scale to support vast numbers of devices. Cloud services are thus attractive for doing large scale offline and real-time analytics on the data produced in IoT applications. The present disclosure investigates a computationally-expensive robotics application to showcase a means of achieving complex parallelism for real-time applications in the cloud.

Parallel implementations of real-time robotics algorithms mostly run on multicore machines using threads as the primary parallelization mechanism, but this bounds parallelism by the number of CPU cores and the amount of memory in a single machine. This degree of parallelism is often not enough for computationally expensive algorithms to provide real-time responses. Parallel computations in a distributed environment could give a cost-effective option to provide low latency while also scaling up or down depending on the processing requirements.

Simultaneous Localization and Mapping (SLAM) is an important problem in which a mobile robot tries to estimate both a map of an unknown environment and its position in that environment, given imperfect sensors with measurement error. This problem is computationally challenging and has been studied extensively in the literature. Here the present disclosure considers a popular algorithm called GMapping, which builds a grid map by combining (noisy) distance measurements from a laser range finder and robot odometer using Rao-Blackwellized Particle Filtering (RBPF). It is known to work well in practice and has been integrated into robots like TurtleBot. The algorithm is computationally expensive and produces better results if more computational resources are available.

The present disclosure shows implementation of GMapping to work in the cloud on top of the IoTCloud platform, a framework for transferring data from devices to a cloud computing environment for real-time, scalable data processing. IoTCloud encapsulates data from devices into events and sends them to the cloud, where they are processed using a distributed stream processing framework (DSPF). In our GMapping implementation, laser scans and odometer readings are sent from the robot as a stream of events to the cloud, where they are processed by SLAM and results are returned to the robot immediately. The algorithm runs in a fully distributed environment where different parts can be run on different machines, taking advantage of parallelism to split up the expensive computations.

Our main contribution is to propose a novel framework to compute particle filtering-based algorithms, specifically RBPF SLAM, in a cloud environment to achieve high computation time efficiency. In the present disclosure, the present disclosure first discusses related work before introducing background on the IoTCloud framework and the SLAM algorithms. Then the present disclosure shows how to design and implement parallel RBPF SLAM in IoTCloud, before concluding with results and discussion.

Additional features and advantages of the present disclosure will become apparent to those skilled in the art upon consideration of the following detailed description of the illustrative embodiment exemplifying the best mode of carrying out the present disclosure as presently perceived.

BRIEF DESCRIPTION OF THE DRAWINGS

The embodiments will be more readily understood in view of the following description when accompanied by the below figures and wherein like reference numerals represent like elements, wherein:

FIG. 10 is an exemplary visualization of test scenario of a performance test;

FIG. 11 is an exemplary visualization of timelines for computation and pose share loops in a topology;

FIGS. 12A-12B illustrate a graphical representation of exemplary time consumption in a topology;

FIG. 14 is a schematic block diagram of an exemplary IoT cloud architecture;

FIG. 15 is a schematic block diagram of an exemplary GMapping Robotics application;

FIGS. 19A-19C illustrate a graphical representation of an exemplary computation time across individual reading for Simbad and 60 particles;

Figure 1:
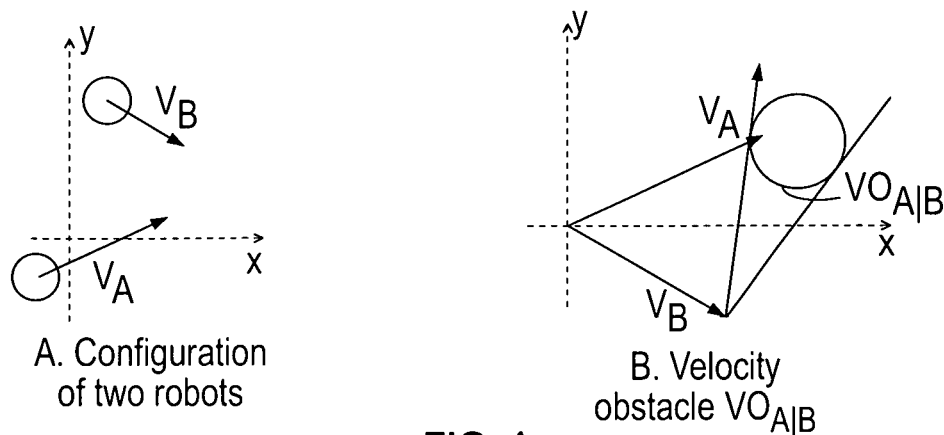
FIG. 1 illustrates an exemplary visualization of a velocity obstacle introduced by Robot B.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate an exemplary embodiment of the disclosure, in one form, and such exemplifications are not to be construed as limiting the scope of the disclosure in any manner.

DETAILED DESCRIPTION OF EMBODIMENTS

Embodiments of the present disclosure are described below by way of example only, with reference to the accompanying drawings. Further, the following description is merely exemplary in nature and is in no way intended to limit the disclosure, its application, or uses. As used herein, the term "module" or "unit" may refer to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the modules, the scope of the present system should not be so limited since other modifications will become apparent to the skilled practitioner.

Local Collision Avoidance for Non-Holonomic Robots

Referring now to FIG. 1, local collision avoidance is one of the most important aspects in robot navigation. The task of local collision avoidance is to dynamically compute the optimal collision free velocity for a robot, which is based on the observation of the environment. Unlike motion and path planning that have static knowledge of the global environment and make one-time decisions, local collision avoidance needs to respond to the dynamics of the environment such as other active entities or obstacles that are not presented in the static map.

Current local collision avoidance methods are mainly based on the Velocity Obstacle (VO) theory. VOs are areas in velocity space where if the velocity of a robot points into one of the areas it will collide with another robot after some time. A diagram of VO is shown in FIG. 1. Several types of VO are defined according to the different VO calculation methods. Reciprocal Velocity Obstacle (RVO) splits the collision avoidance responsibility equally between the two robots that may collide with each other, while the Hybrid RVO (HRVO) translates apex of RVO to the intersection of the RVO leg closest to its own velocity and the leg of VO furthest from its own velocity, which encourages choosing preferred sides and reduces the chance of a reciprocal dance.

All these methods assume that the robot can reach any velocity in the velocity space, one hundred percent accurate localization information, and circular robot footprint. However, the real robot cannot satisfy such prerequisites. Therefore, other constraints need to be attached to those VOs. These include kinematic constraints such as acceleration and max velocity limits, Non-Holonomic constraints for differential robots, and localization uncertainty. When considering localization uncertainty, a robot footprint needs to be expanded so that it can cover the uncertainty from localization and make sure that the calculated velocity is valid even if localization is not accurate. Simply using a circular footprint with an extended radius may exclude possible valid velocities. So the convex hull footprint calculated from the Minkowski Sum of robots and obstacles is introduced in calculating VOs. The calculation of convex hull footprint for a robot is highly computation-intensive and may take around 50 percent of the total computation time.

Once all VOs are obtained from velocity space, an optimization algorithm needs to be designed to select optimal velocity from areas outside all VOs. There are three key methods for collision free velocity selection. They are Optimal Reciprocal Collision Avoidance (ORCA) method, Clear Path method and Sampling based method. Clear Path method has relatively better overall performance in real world experiments.

Taking into account all the detailed considerations above, an algorithm that can control robots in the real world to avoid each other in a more effective way is developed. But such algorithm requires at least a laptop to run. In swarm robotics the number of robots can reach about one hundred or more, and, obviously, equipping a laptop for each robot can greatly increase the investment and also the size of the robot, besides which, power consumption of a laptop will lead to less robot running time.

To utilize the algorithm but, at the same time, reduce the "side effects", one effective approach is offloading algorithm computation into a Cloud environment and connecting the robot through a wireless network. In the present disclosure, an algorithm, which uses a convex hull footprint for VO calculating, considers all aforementioned constraints, and utilizes Clear Path method for optimal velocity computation, is implemented. The following paragraphs offer details about the Cloud platform and illustrate the implementation of the algorithm.

IoT Cloud Architecture

Figure 2:
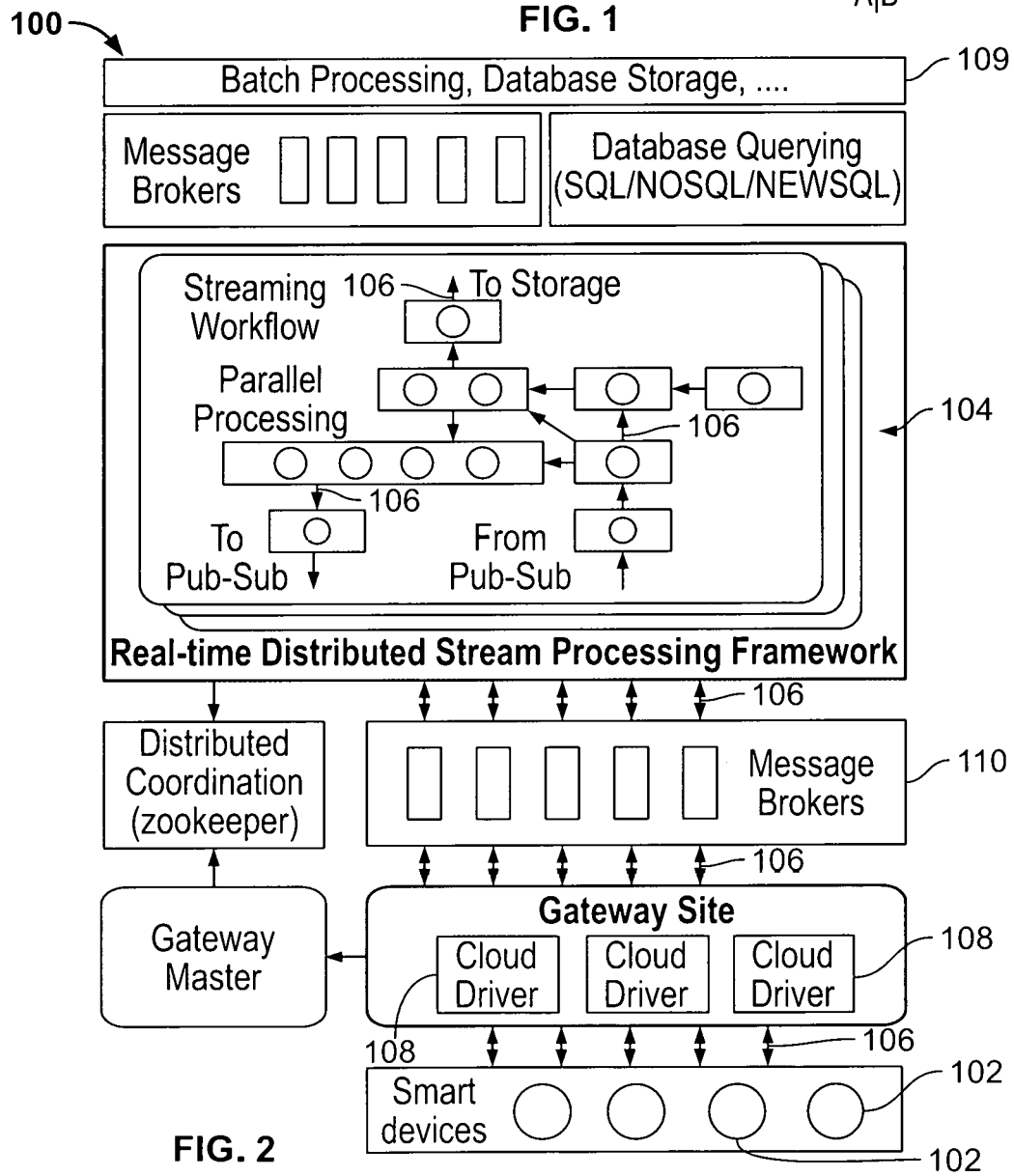
FIG. 2 is a schematic block diagram of an exemplary architecture of an IoT cloud configuration.

Referring now to FIG. 2, the IoT Cloud is a platform that provides Cloud services for a large number of Internet-accessible devices. The IoT Cloud mainly consists of three layers: Front-end Gateway Layer 108, Stream Processing Middle Layer 104 and Batch/Storage Back-end Layer 109. The three layers are connected via message broker 110 and coordinated by Zookeeper. FIG. 2 depicts all major components of a system, generally designated 100, of controlling an operation of a robot 102 using a cluster of nodes 104 in a network 106.

The Front-end Gateway Layer is responsible for connecting devices or robots 102 with the Message broker 110. As IoT Cloud is designed to serve heterogeneous devices, it needs a component to record specific information about the devices and the map between message broker channels and native device data channels. Such a component is the Gateway. All devices are connected through the Gateways, and below the Gateways are IoT Cloud device drivers which convert device data into messages that Cloud services can process. The Cloud device drivers first get data from devices and then call IoT Cloud APIs to send converted data into the Cloud. The Gateway maintains connections between devices and the Cloud. At the same time, there is a Gateway master that coordinates multiple Gateways and registers connection information, such as data channel mapping between message broker and devices, so that the Middle layer can discover devices and provide seevice entries.

The Stream Processing layer handles real-time data processing. This layer uses Apache Storm as the computation engine. Storm is a distributed real-time streaming processing system that can process at most one million Tuples (data type processed in Storm) per second. It is very suitable for processing stream data from numerous smart devices. Storm gets source data from one of its components called Spout and then sends data to a process component called Bolt. Spouts and Bolts are arranged as nodes in a graph that are connected by streams which resemble the edges of a graph. Such a stream processing workflow is called Topology. To use the IoT Cloud service, application Topology should be developed first. Since data input and output of the application Topology are closely related to devices, the IoT Cloud platform provides APIs to build custom input Spouts and output Bolts. As mentioned before, the Gateway layer is responsible for maintaining the connections of Spouts and Bolts to the message broker by writing connection information to Zookeeper. To use the real-time stream processing service in this layer, data from devices should be sent to the correct message broker channels, which are connected to the input Spouts of an application Topology via IoT Cloud device drivers. Then, by subscribing the channels that connect to the output Bolts of the application Topology, results can be fetched in real time. Such a data processing paradigm is very suitable for robot controlling. Most of the work in the present disclosure focuses on designing and implementing application Topology and its corresponding IoT Cloud driver for robot collision avoidance. The bulk of the computation required for the collision avoidance algorithm is shifted to this layer. Once an application is deployed into the IoT Cloud, it can provide services to a large number of devices as long as they have the correct IoT Cloud drivers. By deploying multiple instances of the application or increasing the number of computation nodes for the application, data processing ability can be scaled accordingly.

The Batch/Storage Layer stores data from Stream Processing Middle Layer and provides Batch Processing/Data Mining services for the static data from various distributed databases. Since the present disclosure mainly works on real-time data processing, this layer will not be used.

Implementation of the Collision Avoidance Algorithm

Figure 3:
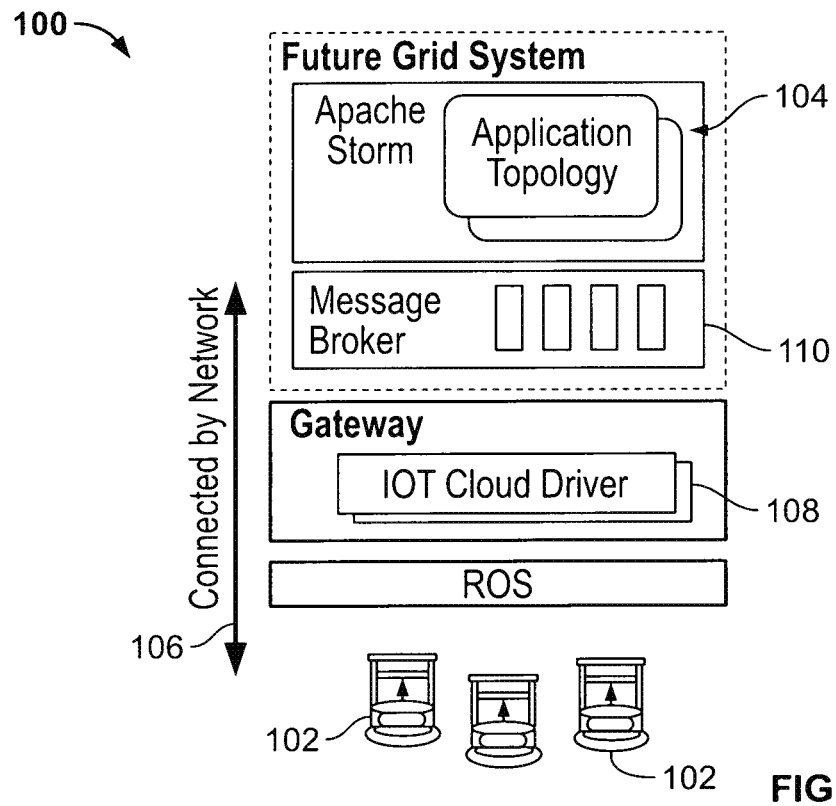
FIG. 3 is a schematic block diagram of an exemplary overview of a collision avoidance application.

Referring now to FIG. 3, it shows the overall design of the collision avoidance application. In the front-end Gateway layer, there is an IoT Cloud driver module 108 which communicates with devices or robots 102 and converts data between message broker 110 and local devices or robots 102. The driver 108 is deployed on the Gateway site, which runs on a local desktop machine, of the IoT Cloud system 100 and is managed by the Gateway. As most robots 102 run Robot Operation System (ROS), here, ROS is adopted as the device driver that interacts directly with the robot 102.

The IoT Cloud driver 108 will subscribe ROS topics to get the robot state, such as odometry, laser scans and so on, and then convert the data into messages that can be transmitted through a broker 110 to the Cloud. After the data processing procedure, the IoT Cloud 104 will send back velocity commands through the message broker. The IoT Cloud driver will convert the velocity command message into a ROS message which is then sent to the correct ROS topic so that the robot can be controlled. The present disclosure uses ROS as a device driver just for demonstration. Besides ROS, other device specific drivers can also be used, as long as they can provide APIs for data retrieval.

The IoT Cloud computation engine together with the message broker servers, are deployed on the FutureGrid Cloud platform. The complicated collision avoidance algorithm is implemented as a Storm Topology running in the computation engine. The message broker of the IoT Cloud relays data from IoT Cloud driver and feeds it into Spouts of the control Topology. Once the velocity command is calculated, the Topology will send the command through an output Bolt to the message broker which then relays the message back to the Cloud driver, and then to the robot.

IoT Cloud Driver for Collision Avoidance

Figure 4:
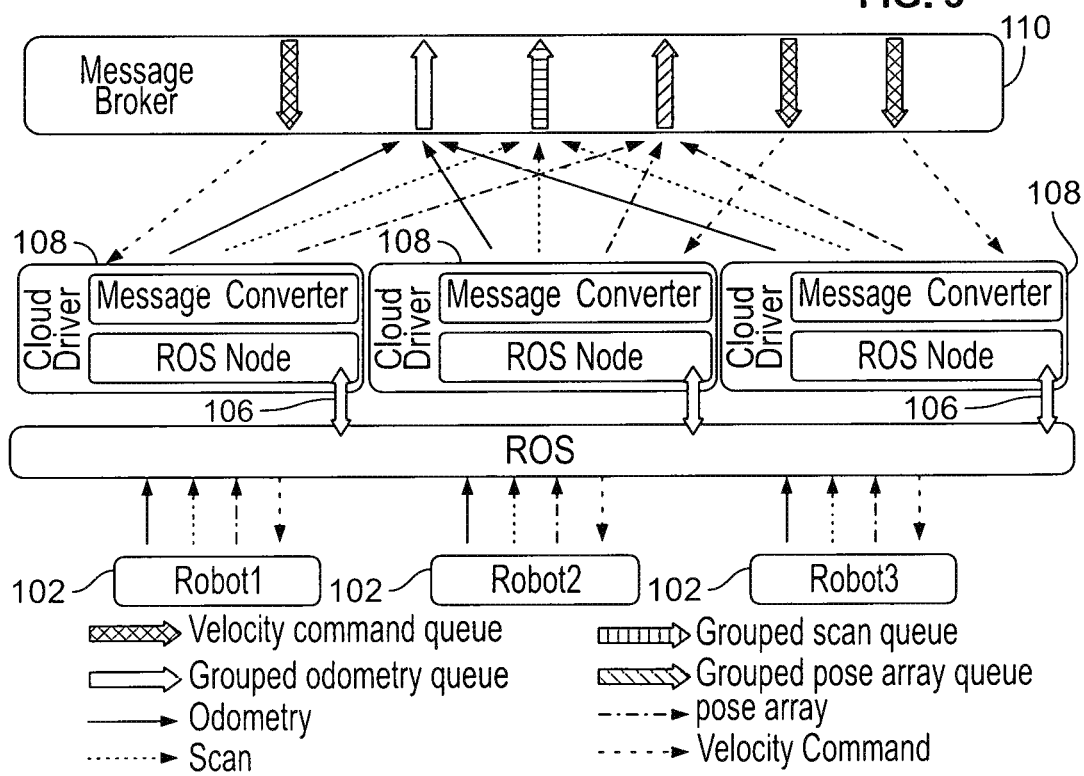
FIG. 4 is a schematic block diagram of an exemplary IoT cloud drive for a collision avoidance.

Referring now to FIG. 4, IoT Cloud driver 108 is used to connect devices or robots 102 to the IoT Cloud Platform 104. For different types of devices, the Cloud drivers are different, but, for the same type of devices, the same Cloud driver can be used and it only needs to spawn a new driver instance for each device. To perform collision avoidance, odometry, laser scan and pose array of the robot need to be sent to the Cloud. All the information is published by the robot 102 through ROS topics as shown in FIG. 4. So the IoT Cloud driver 108 first subscribes these topics and gets the ROS messages. However, these ROS messages are not viable for message brokers, such as Rabbitmq which is used in this work, and it is the Cloud driver 108 that converts these messages into custom defined data types that can be processed by the message broker 110 and the Topology.

The next thing that an IoT Cloud driver 108 needs to do is defining IoT Cloud channels for those ROS topics. For IoT Cloud application Topology, each input Spout or output Bolt is connected to a predefined IoT Cloud channel according to the application and the message broker. All data are transmitted through these channels. While the number of Spouts and Bolts in an application topology cannot be changed, the number of the robot that connects to the Cloud may vary from time to time. So IoT Cloud channels should be defined according to the robot information types rather than the robot entity. Thus, the IoT Cloud driver 108 will create an IoT Cloud channel for each information type and publish converted messages to the corresponding Cloud channel. To distinguish the messages sent from different robots 102, a unique robot ID generated by the Cloud driver 108 is attached to the message. The application Topology will get the correct robot state according to the ID. However, the Bolt of the application Topology that publishes velocity commands back to robots 102 will also publish all commands for different robots into one IoT Cloud channel. It is the Gateway that creates a command queue for each Cloud driver instance, and sends each message to the correct queue according to the robot ID attached in the message.

Topology Design

Figure 5:
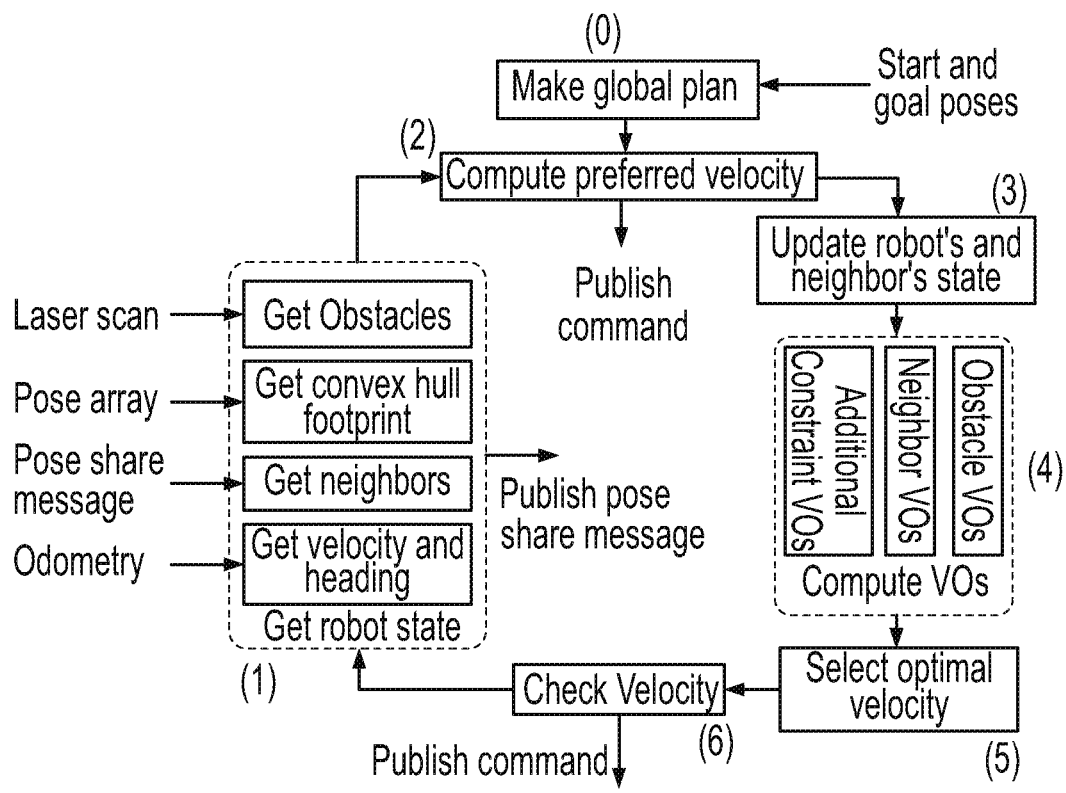
FIG. 5 is a schematic block diagram of an exemplary collision avoidance algorithm.

Referring now to FIG. 5, all the algorithm and control logic for IoT Cloud based collision avoidance are implemented in the Storm Topology. Before designing the application Topology, some details of the collision avoidance algorithm which is implemented in local mode should be explored. The collision avoidance algorithm introduced here is summarized in FIG. 5.

The algorithm runs as a control loop which executes periodically. For a single loop, it starts by collecting the robot's newest state information, including getting obstacles from the laser scan, calculating convex hull footprint from pose array, getting neighbors from pose share messages, and extracting velocity and pose of the robot from the odometry. The next step is to calculate preferred velocity from a global plan. The present disclosure implements a very simple global planner that generates a straight path consisting of a number of way points from the start to the goal. If the robot has already reached the goal position and it only needs to adjust its heading, then a stopping velocity command or rotating command will be sent to the robot directly. Otherwise, the algorithm will update the robot's position and its neighbors' according to the predefined control period. With all the information up-to-date, VO lines from different aspects will be calculated. Such VO lines include those from neighbors, obstacles and various constraints, such as aforementioned kinematic constraints, non-holonomic constraints and so on. Once all VO lines are obtained, the optimal velocity that is closest to the preferred velocity is selected using Clear Path algorithm. Finally, the application will check the validation of the new velocity computed. If it is valid, the velocity will be sent to the robot, otherwise the application will try the next way point and calculate a new velocity.

To implement the whole application into a Storm Topology, Spouts and Bolts that connect the Topology and the message broker should be designed first. As there are five types of information that need to be uploaded into the Topology, five Spouts need to be defined. These Spouts include odometry receiver Spout, scan receiver Spout, pose array receiver Spout, configuration Spout and pose share receiver Spout. The first three Spouts are used to get robot state information, while the configuration Spout receives basic parameters of the robot, such as control frequency, acceleration limits, maximum velocity, start pose and goal pose and so on, and the pose share receiver Spout is responsible for feeding information about all neighbors to the Topology. Two Bolts are required for publishing the computed velocity command and pose share messages to the message broker respectively. As the algorithm needs the neighbors' information, all robots in the scene should publish their state to a common IoT Cloud channel periodically so that they can share their newest state with each other. All of these Spouts and Bolts are defined in a configuration file and the IoT Cloud platform will automatically generate them according to this file.

Referring now to FIGS. 6A-6D, the rest components of the application in FIG. 5 can be implemented in different ways. For example, all of the rest components can be integrated into one Bolt, or each of the components can be implemented into a Bolt. Three possible Topologies are shown in FIGS. 6A-6D.

All of the three Topologies are implemented in JAVA. Topology A integrates all components into one Bolt 600. As all messages are fed into the Bolt, the Bolt is so busy dealing with new messages that the overall delay of the velocity command is high. Topology C implements each component into separate Bolts, and even calculates different types of VO lines in parallel. However robot state information has to be transmitted between several Bolts, resulting in the serialization/deserialization process along with the communication delay between computation nodes consuming much more time than the time that is saved by parallel computing. So the overall delay of Topology C is also very high. By reviewing the performance metrics of Topology A and C, it is demonstrated that Bolts, which process input messages from Spouts, require much less computation than the Bolts that calculate VO lines and velocity commands. So, in Topology B, all components that process robot state information are combined into one Bolt and other components that calculate VO lines and velocities are wrapped into another Bolt. Such a design can reduce delays caused by data transmission between Bolts and, at the same time, isolate message processing from the main collision avoidance algorithm.

Besides those Spouts and Bolts that interact with message broker, there are five more components in Topology B. To utilize collision avoidance control service, a robot should first send its parameters and start and goal poses to the Global Planner Bolt through the Configuration Spout. The Global Planner Bolt will then do the following jobs:

a) Make a global path plan according to the start and goal Poses.

b) Spawn a custom-defined JAVA Object called Agent that contains robot parameters, some algorithm related state variables, and the global plan generated before, and send it to Velocity Compute Bolt.

c) Spawn a Control-Publish Time State Object that contains control period and pose share period, and, also, two variables to record the last time that the robot is controlled/published respectively. Besides, there are two Boolean variables that record whether the Topology is currently calculating velocity or publishing pose share message. This Object will be sent to the Dispatcher Bolt that triggers control or pose share processes according to the given period.

d) Spawn a Pose Share Message Object that contains basic information to be shared. This object is sent to the Agent State Bolt for robot pose sharing.

Each of the three Objects spawned by the Global Planner Bolt will be stored as <robot Id, object> Hash Map in the destiny Bolt.

The Dispatcher Bolt will check those Control-Publish Time State Objects stored in the Bolt instance for controlling or pose sharing. Every 10 ms it will receive a Tuple from the Timer Spout, which will trigger the Dispatcher Bolt to check whether it needs to emit a new Tuple to the Agent State Bolt to start a new controlling/publishing loop.

The Agent State Bolt implements modules that collect up-to-date robot information as shown in FIG. 5. If it gets a Tuple that tells it to calculate a new velocity command, then the Bolt will create a new Agent State Object and store all current robot state information in the Object, then send it as a Tuple to the next Velocity Compute Bolt. Otherwise, if the Tuple asks it to share the robot information to others, the Bolt will fill a Pose Share Message Object with the current state information and send it to the Pose Share Publish Bolt for publishing the message to the message broker. After this Pose Share Message is published, Agent State Bolt also needs to send back a Tuple to the Dispatcher Bolt to tell it that the current job is done and a new Pose Share task for this robot can be accepted.

The Velocity Compute Bolt contains all other modules for velocity command calculation. After a new Agent State Object is received, this Bolt will select the correct Agent Object from the Hash Map that stores Agent Objects from Global Planner Bolt and then execute step 2 to step 6 in FIG. 5. If the calculated velocity command is valid, it will be sent to Velocity Command Publish Bolt to publish the command back to the Cloud driver via a message broker. Just like Agent State Bolt, this Bolt has to send a Tuple back to the Dispatcher Bolt to tell it that the Topology is ready to receive the next calculation requirement for this robot.

As mentioned before, some of the Bolts may cache some runtime information about a robot. However each Bolt can run multiple instances in parallel, and how to make sure the proper Tuple is sent to the Bolt instance that caches the right robot information is very important to the process logic. In Apache Storm, the organization of connections between instances of different connected Bolts is called Grouping. Here, each Tuple, except the one emitted from Timer Spout, is attached with the robot ID Field and Field Grouping based on the ID Field is used. However, for Timer Spout, all Dispatcher Bolt instances need its periodical output as a time reference. Also the Agent State Bolt instances need to cache every robot's pose share information so that they can extract all neighbors for each robot. As such, these two components use All Grouping.

Figure 6A:
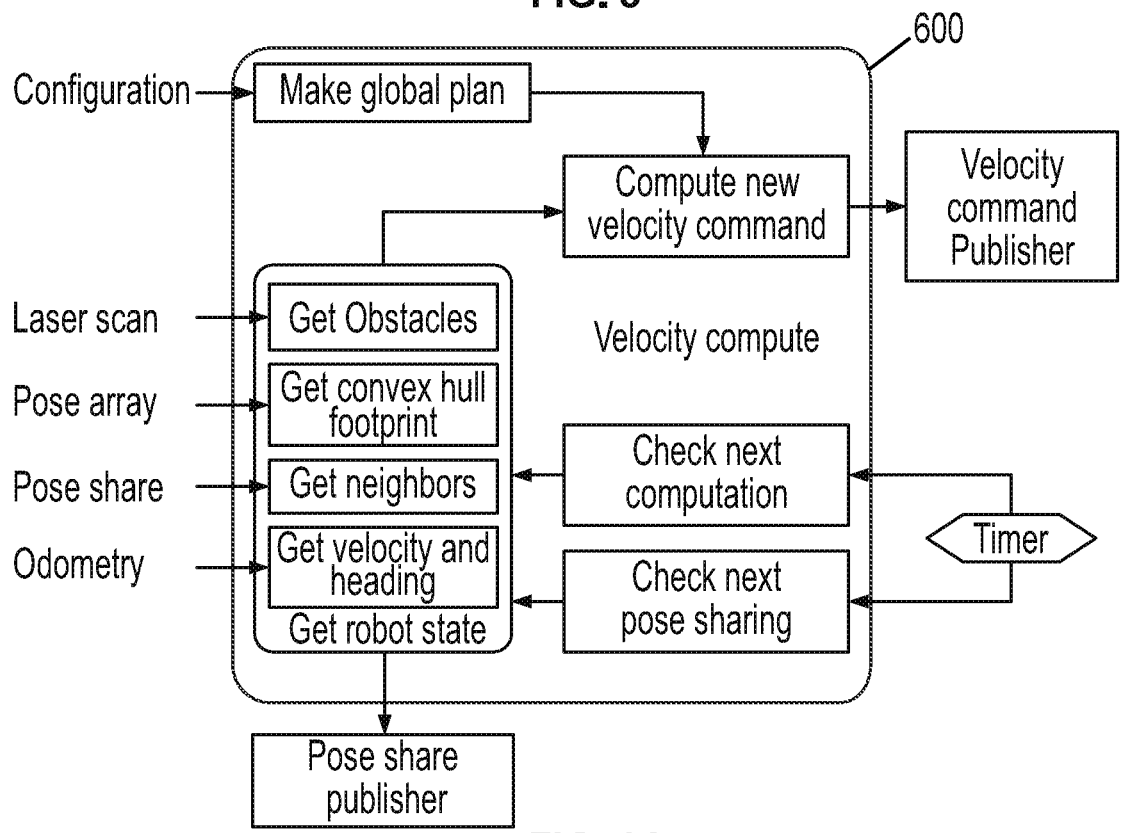
FIGS. 6A-6D illustrate a schematic block diagram of exemplary topologies for a collision avoidance application.
Figure 6B:
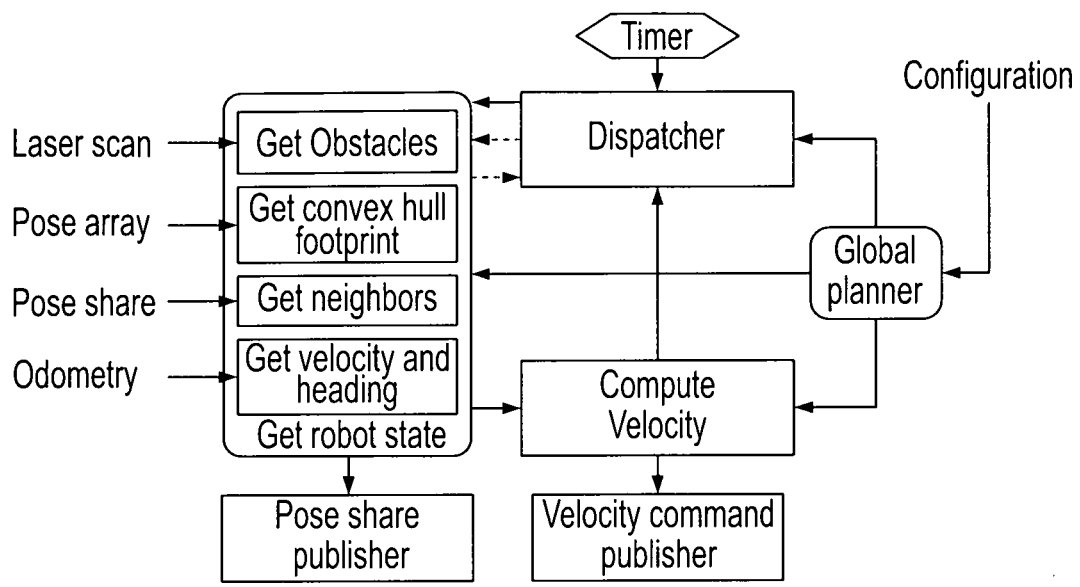
Figure 6C:
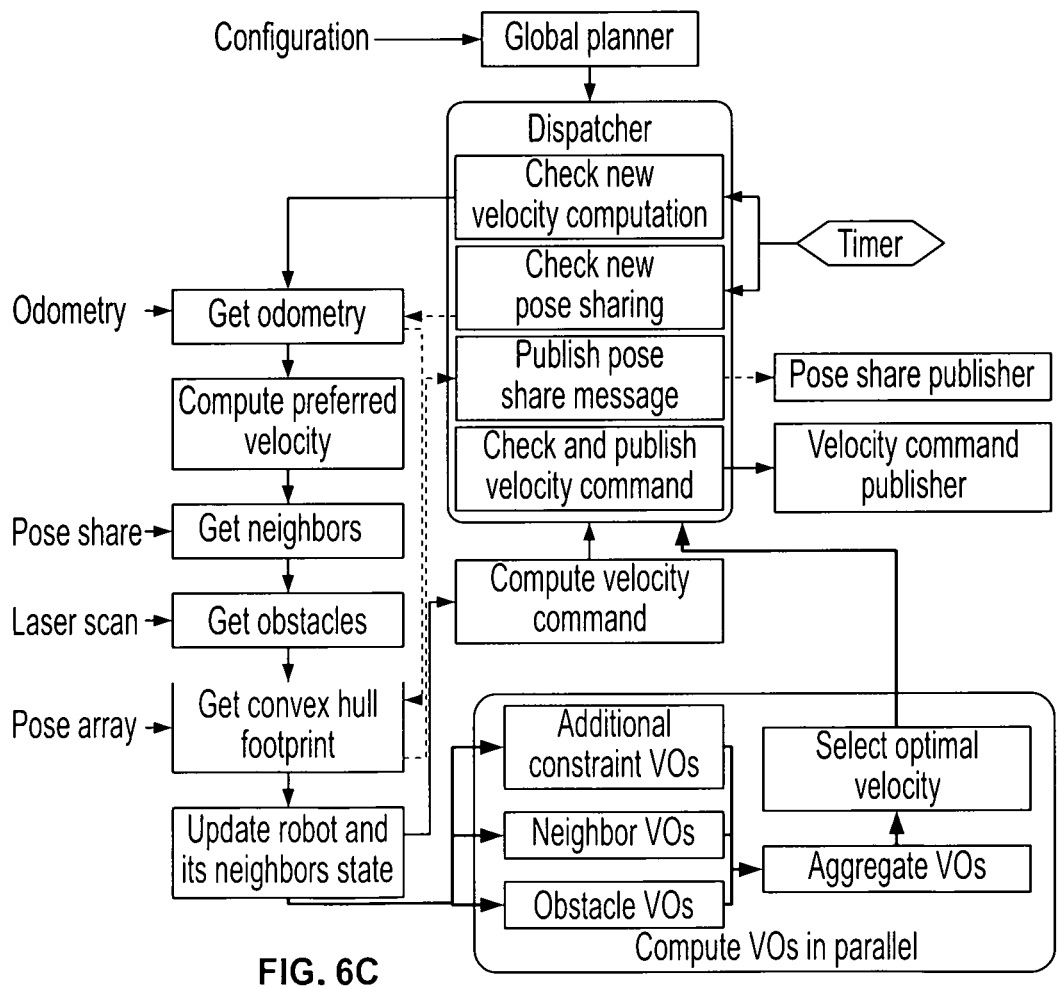

The Topology shown in FIG. 6B can be used to control multiple robots and only needs them to send the required information and parameters to the Topology. From the Cloud Computing perspective, the IoT Cloud platform that runs this application Topology can provide robot collision avoidance control services to multiple robots. And with the ability to scale the platform, the application, or even a single Bolt in the Topology, such robot control framework can be used in Swarm Robotics that need to control a multitude of robots and at the same time retain the details of the robot model or the algorithm.

Experiment and Results

Figures 6D, 7:
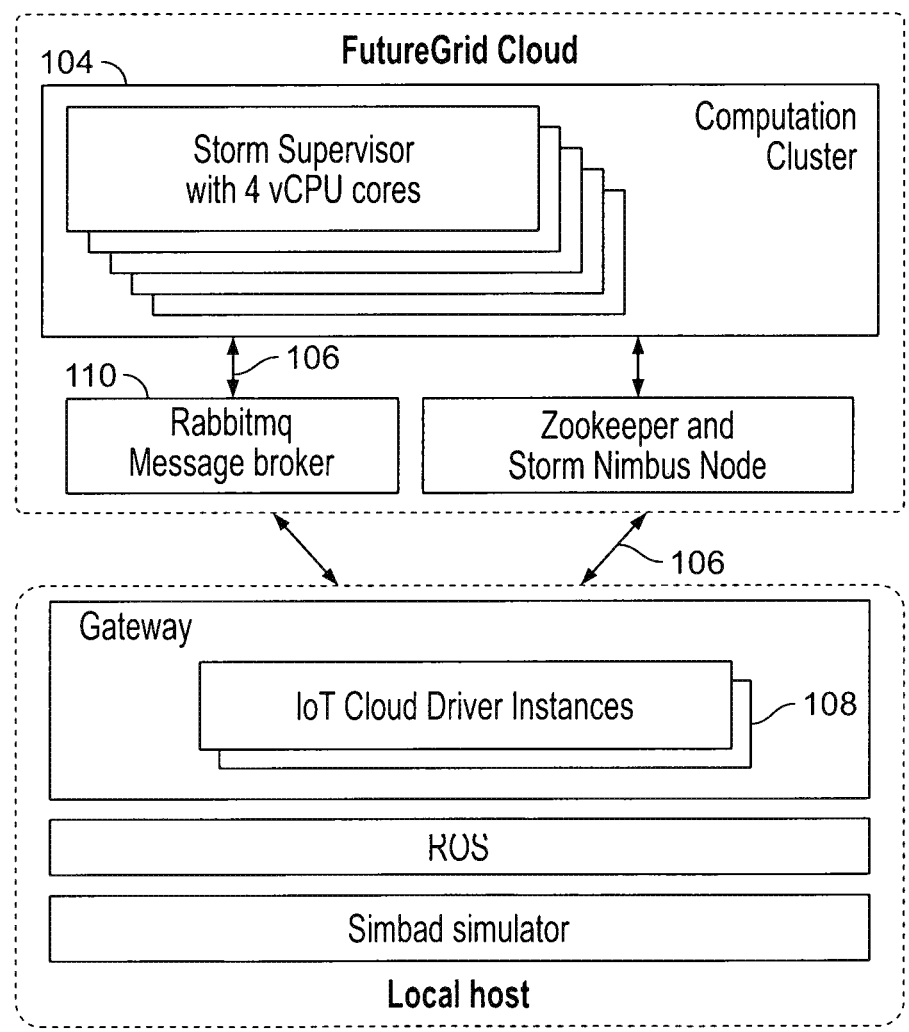
FIG. 7 is a schematic block diagram of an exemplary deployment of an experiment system.

Referring now to FIG. 7, to verify the application developed in the present disclosure, several experiments and tests were carried out. As the algorithm implemented in the present disclosure has already been tested in real world multi-robot collision avoidance, the present disclosure will only use a software simulator to test the application. The simulator is Simbad. Simbad can simulate differential robot with laser scan range finder sensor. More importantly, Simbad is a light-weight simulator which is able to simulate more than 100 robots in one scene. Deployment of the whole experiment system is shown in FIG. 7.

Apache Storm and Rabbitmq Message Broker are deployed in the FutureGrid Cloud Platform while the IoT Cloud Gateway is deployed with the Cloud driver, ROS and the simulator being on a local desktop computer. The Simulator will publish the information of each robot to ROS and then the IoT Cloud driver will convert those ROS messages into custom-defined JAVA Objects that are used in the Topology. Configurations of the system are presented in Table 1.

TABLE 1

| Hardware Configuration of the System | | |
|---|---|---|
| | VMs in Cloud | Local host |
| CPU Model | Intel Core i7 9xx | Intel Core i7-2620M |
| CPU Frequency/Mhz | 2931.436 | 2701 |
| Cores | 4 | 2 |
| Thread per core | 1 | 2 |
| Memory/MB | 8192 | 7900 |
| OS | Ubuntu 12.04.4 (Linux 3.2.0) | Ubuntu 12.04.5 (Linux 3.13.0) |
| Hypervisor | KVM | None |

The main task of this experiment is to test the availability of the application for large scale robot control. Since no SLAM (Simultaneous Localization and Mapping) module is developed in Simbad and Localization Pose Array cannot be generated, here Gaussian noise is added to the robot pose to create a fake localization pose array for the test. Pose array is published at a frequency of 10 Hz and other information is published at a frequency of 20 Hz.

Local test shows that the most computation-intensive component is the Velocity Compute Bolt, so velocity command delays for different number of robots with a different parallelism hint for Velocity Compute Bolt is measured. As shown in Table 1 there are 5 computation nodes with 20 cores in the cluster. To make sure each Bolt instance runs in parallel, the maximum number of parallel instances for Velocity Compute Bolt is limited to 5, while for Agent State Bolt it is set to 2 to see whether increased parallelization of the Agent State Bolt can bring better performance. Other components in the application Topology have only one instance for each. Also, to make sure the computation load is evenly distributed between the instances, the Filed Grouping strategy is replaced by custom defined Mod Grouping and an index value sequentially from 1 to maximum number of robots is assigned to each robot. This index is attached to all messages and Mod Grouping uses results of the index Mods the number of target Bolt instances to select which instance or task the message is sent to.

Figure 8:
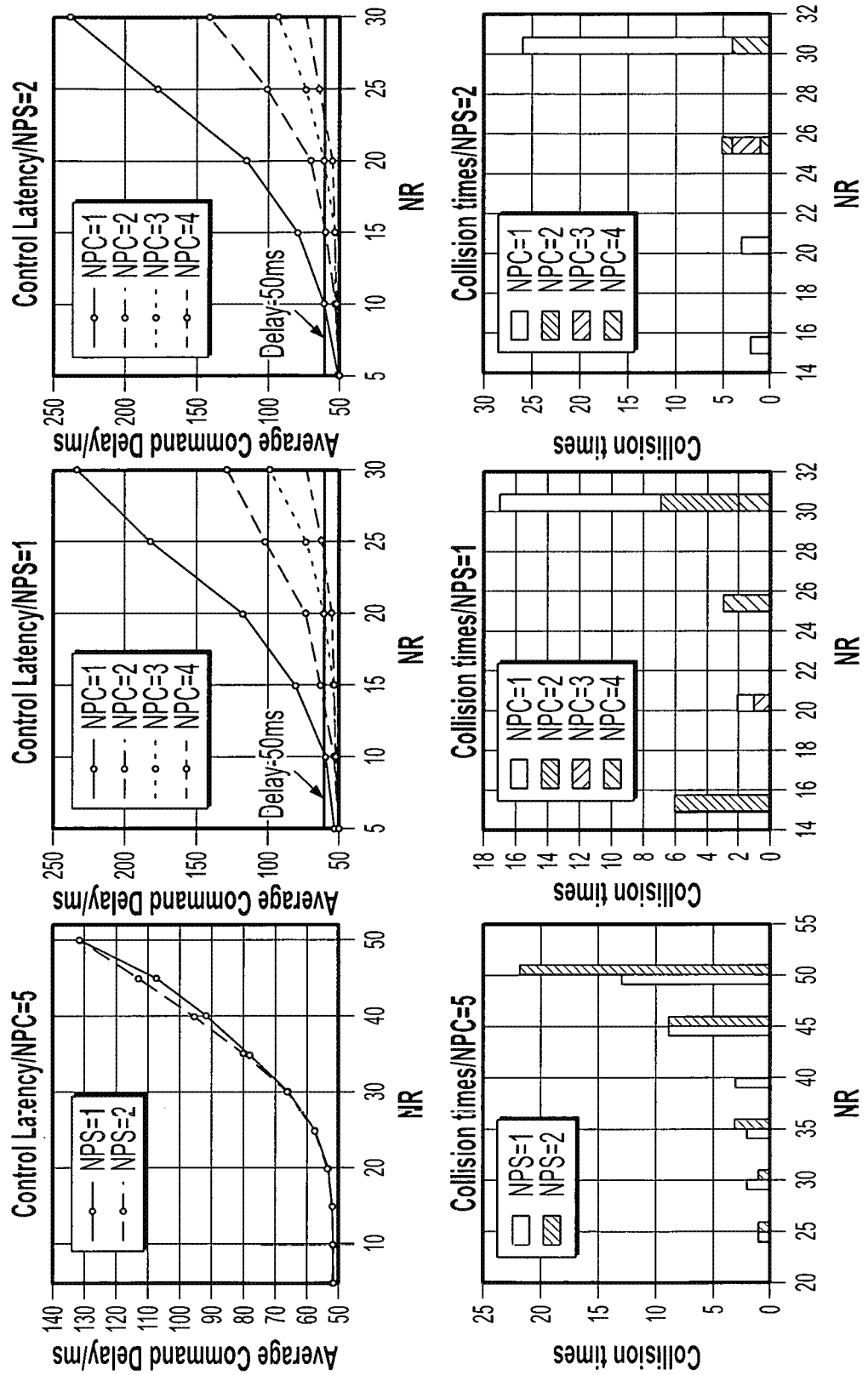
FIG. 8 is a graphical representation of exemplary test results for different combinations of NPC and NPS.

Referring now to FIG. 8, firstly, NPC (Number of parallelism for Velocity Compute Bolt) is set to 5 and NPS (Number of parallelism for Get Robot State Bolt) is changed from 1 to 2. Testing the delays and collision times for NR (Number of robots) range from 5 to 50 to see how many robots the system can serve. Both the control frequency and robot pose share frequency are set to 20 Hertz, which means velocity command latency should be around 50 millisecond for the robots to avoid colliding with each other effectively. All robots are arranged on a circle with a radius of 6 meters and centered on the origin of the coordinate. These robots will go through the center to the antipodal position, then turn around and repeat the process. Each test runs for 300 seconds. Results are shown in FIG. 8(A1) and FIG. 8(B1).

FIG. 8(A1) and FIG. 8(B1) indicate that when the number of robots increases to 25, collisions will happen and the average velocity command delay will increase to around 57 milliseconds. So for NPC less than 5, the maximum number of robots is set to 30. The test results are shown in FIG. 8(A2) to FIG. 8(B3).

NPC is the number of parallelism for Velocity Compute Bolt and NPS is the number of parallelism for Get Robot State Bolt. The first column of the figures shows command delays and collision times of robots with NPC=5, NPS varying from 1 to 2 and the maximum NR (Number of Robots) in the test set to 50. The rest of the figures show test results with NPC varying from 1 to 4, NPS varying from 1 to 2, and the maximum NR in the test to be 30.

FIG. 8(A2) to FIG. 8(B3) show that when the delay increases to around 60 milliseconds, collisions will occur. However in dense scenarios, collisions may still happen if the delay is less than, but still near to, 60 milliseconds. Also, increasing the parallelism of Agent State Bolt does not improve the performance. This is because computation load on the Agent State Bolt is very small (load capacity on this Bolt is less than 5%) and the overhead resulting from parallelization is almost comparable to the computation load on this Bolt. Thus increased NPS will generally bring no performance improvement in this test.

Figure 9:
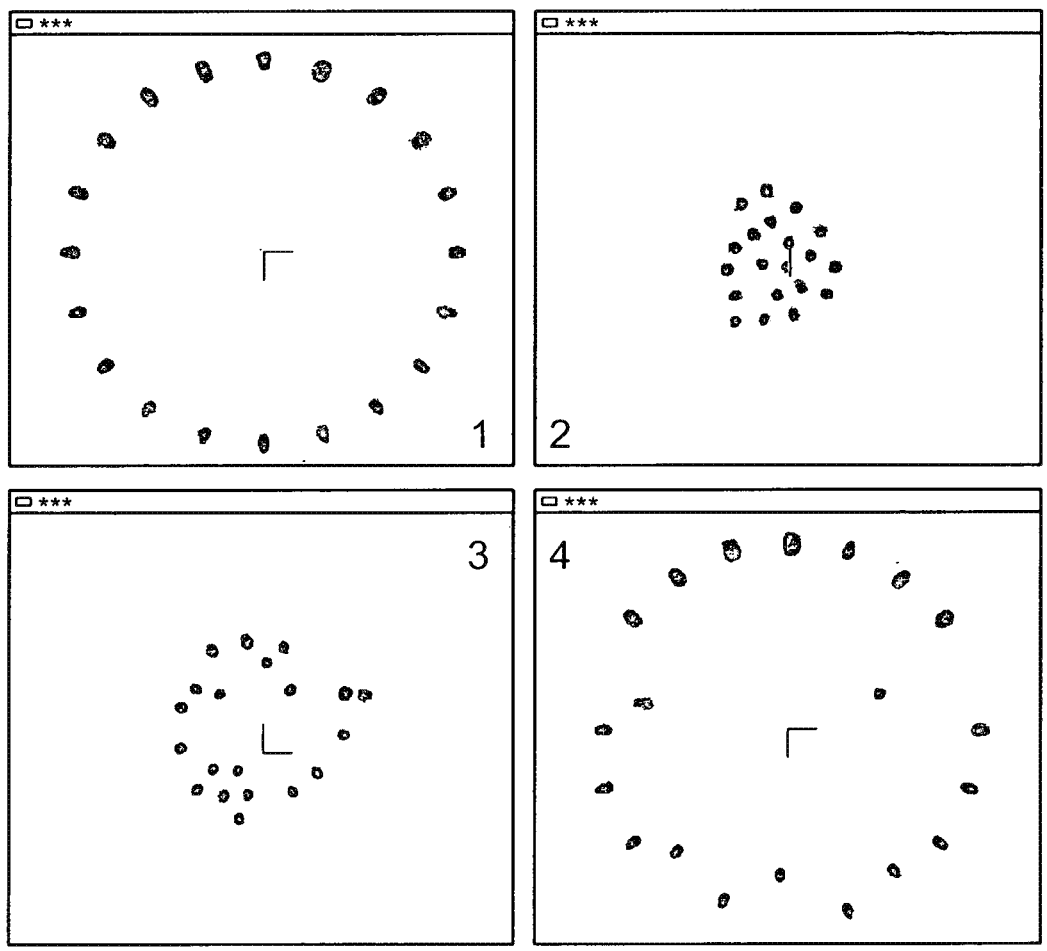
FIG. 9 is an exemplary visualization of snapshots of a performance test.

All results in FIG. 8 show that with the increase of parallelism for Velocity Compute Bolt, delay of the calculation for new commands decreases drastically, which proves that IoT Cloud can be used for real-time robot control. Moreover, IoT Cloud based applications can maintain good performance by simply scaling the computation resources in the Cloud when the number of robots increases. Such scaling ability with real-time controlling provides a novel approach for Swarm Robotics or even Swarm Intelligence that includes more than just robotic area. FIG. 9 shows some snapshots of the simulation.

Performance Test

Referring now to FIGS. 9 and 10, our previous test demonstrates that the application can control a swarm of robots to avoid collision. However the test cannot determine the overall performance of the application since robots are not set in a dense scenario. In this section robots are arranged very close to each other as shown in FIG. 10 to test the performance of the system.

Robots are placed in a square array all facing the origin of the coordinates and the antipodal position is set as the goal. If the number of the robots in a row/column is odd, all robots are shifted a little so that the start position and the goal position will not be the same for all robots. Additionally, to keep the scenario dense all throughout the test, the control command is not executed by robots, so robots will not move during the test.

Previous results show that except for Velocity Compute Bolt, other components in the Topology have load capacity less than 5%, so there are still many computation resources available in the cluster and increasing NPC to a reasonable number larger than 5 will not affect the test. Here NPC is set to 6, 8 and 10 with NPS varying from 1 to 2.

Referring now to FIG. 11, to get deep insight into the performance of key components in the application, detailed time consumptions in the control and pose share loops are measured. The timeline for each loop in the IoT Cloud is shown in FIG. 11. The pending process in FIG. 11 contains data transmitting between Bolts and queuing to wait for the next Bolt to become available. If the sum of all pending and computing time in a loop is less than the preset control/pose share period, there will be additional waiting time.

Figure 12B:
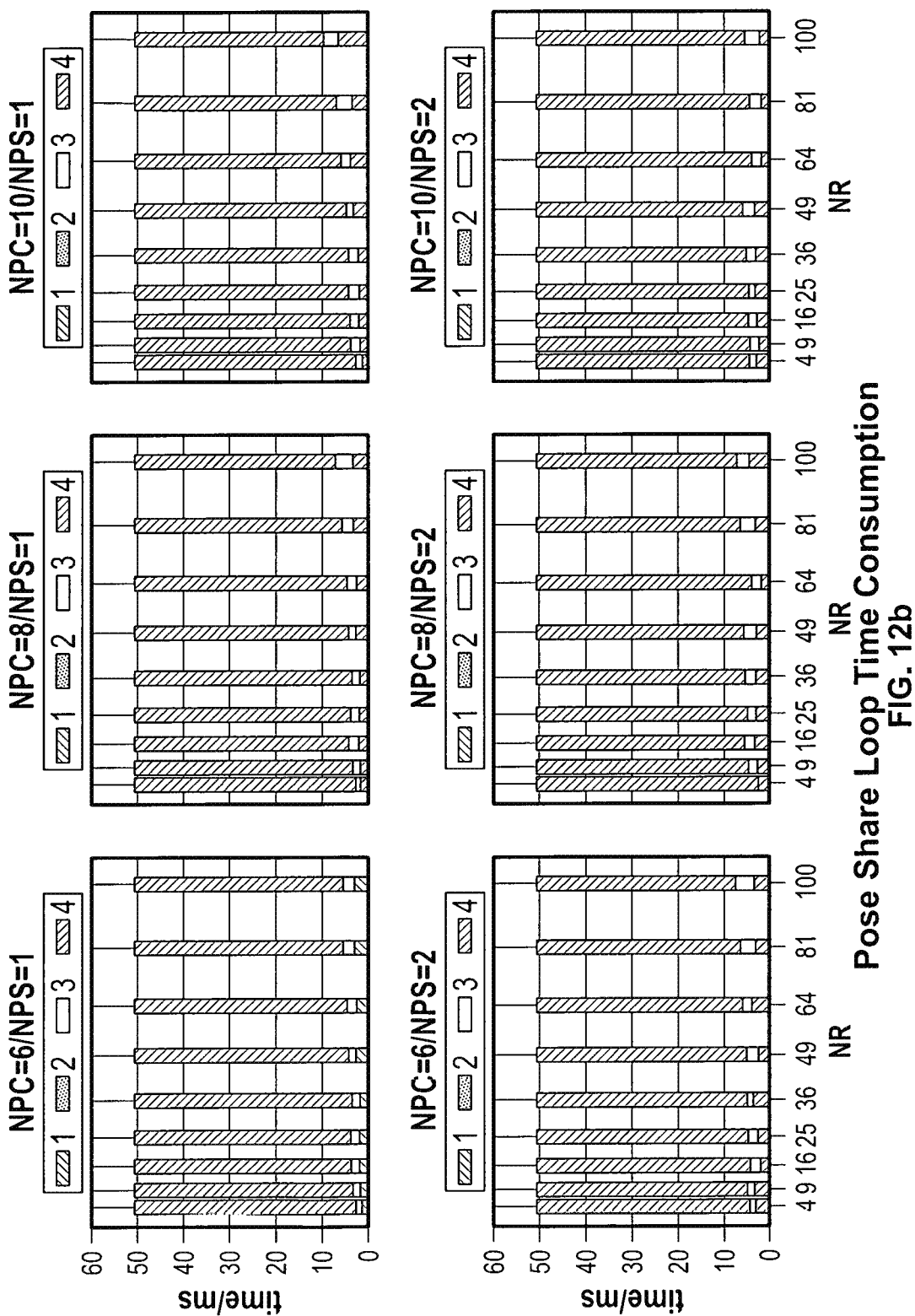

Referring now to FIGS. 12A-12B, test results are shown. From FIG. 12A, it can be seen that the application spends most of its time calculating the velocity and waiting for the calculation of other robots. So by increasing NPC, more robots can run in parallel, which will reduce the time in process 3 and subsequently decrease the control latency as shown in FIG. 12A. However, similar to the previous test, increasing NPS will generally cause little degradation in the performance. But with the increasing of NPC such degradation can be ignored.

In the pose share loop as shown in FIG. 12B, time needed for processing and data transmitting takes only a very small portion of the overall period. The result is that the pose share period is always close to the period that is preset. Although there is some overlap between the two loops, the influence of pose share loop on the control loop can be generally ignored.

Figure 13:
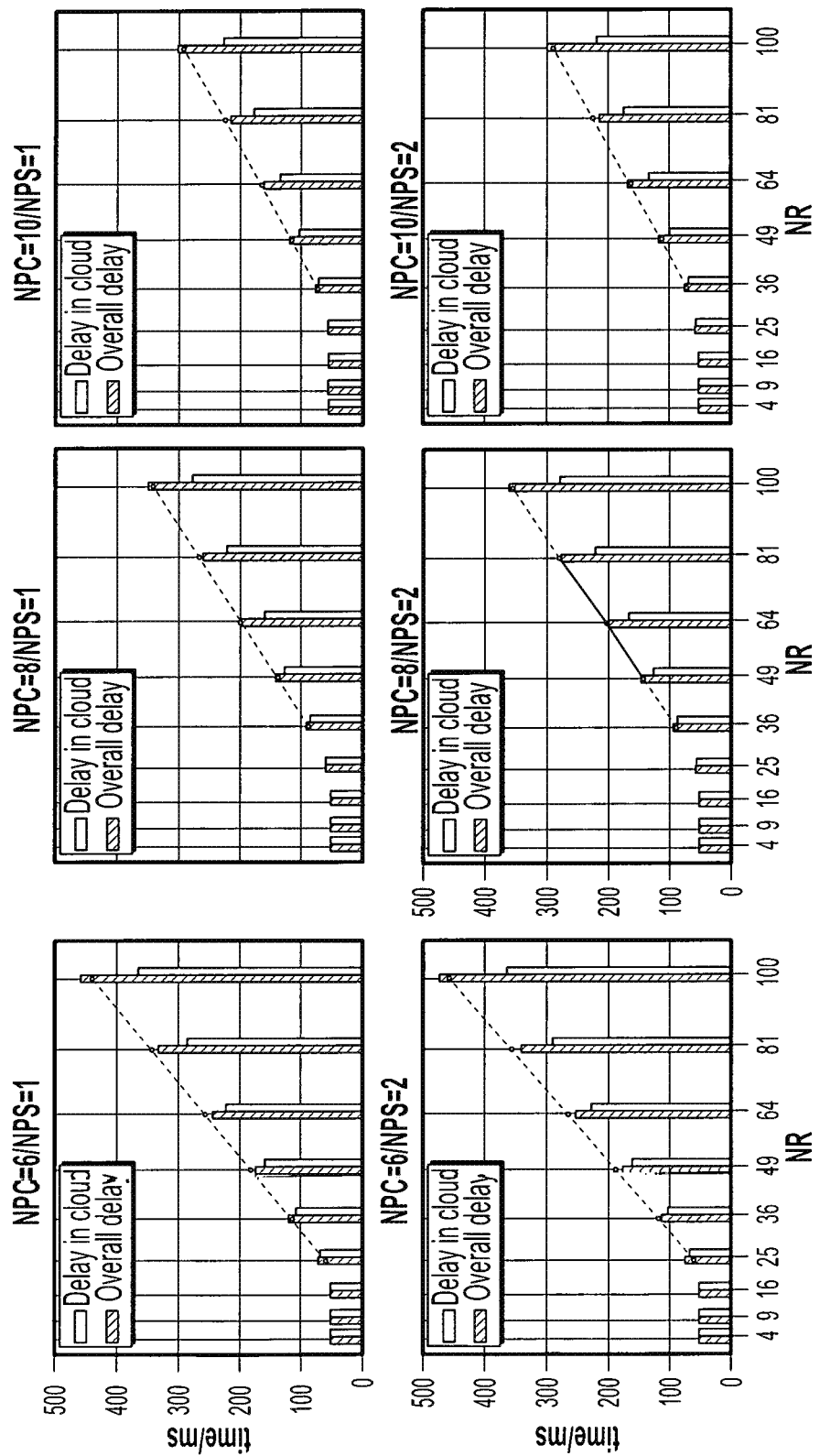
FIG. 13 is a graphical representation of an exemplary overall control latency.

Referring now to FIG. 13, the overall velocity command delay is shown. Here after the velocity command is emitted from the Topology, it still needs some time to reach the robot. The extra delay in this process contains both communication latency and broker and ROS message routing latency. When NPC is 6, the maximum extra delay is round 100 ms, and after increasing NPC to 10, more velocity command messages can be published in parallel, so the maximum extra delay reduces to around 70 ms.

Since the number of parallel instances for Velocity Compute Bolt dominates the overall control delay for each robot, it is important to analyze the relationship between NPC and the maximum number of robots that the application can serve while keeping command latency close to the preset control period. To do so, the relationship between the overall control latency and the number of the running robots should be analyzed first. Then, the maximum number of robots that can be served for control latency around the preset control period can be determined. FIG. 13 shows that when the overall delay is longer than the control period, which is set to 50 ms in this test, the relationship between NR and the delay is close to linear. Thus a linear function as shown in equation (1) can be used to formulate the relationship between NR and the overall delay.

$$\begin{cases} t = k*NR + b \\ t > T + \Delta T \end{cases} \quad (1)$$

While t is the overall control delay, NR is the number of robots, k and b are coefficients for the linear function, and $\Delta T$ is the execution period of the Time Spout. The reason for selecting $t > T + \Delta T$ is that only under this condition can the instance run in full load, which can reflect the computation capacity of the instance.

Using Linear Regression Analysis, k and b can be calculated and the fitted curve is shown as blue dotted line in FIG. 13. k and b for different NPC are listed in Table 2. By solving inequality (2), the maximum number of robots that the application is able to run for different NPCs can be found. The result is also in Table 2. This can be used to decide the computation resource that is required for controlling a certain number of robots. It is also the basis for system scaling and load balancing.

$$k*NR + b \leq T \quad (2)$$

TABLE 2

Maximum Number of Robots that the Application can Serve with Different NPCs

| NPC | NPS | k | b | n* |
|---|---|---|---|---|
| 6 | 1 | 5.09 | −68.2 | 23 |
| 6 | 2 | 5.29 | −74.57 | 23 |
| 8 | 1 | 4.02 | −61.07 | 27 |
| 8 | 2 | 4.17 | −62.11 | 26 |
| 10 | 1 | 3.46 | −57.04 | 30 |
| 10 | 2 | 3.47 | −57.43 | 30 |

In applications and platforms that involve wide area network communication, the data transmitting latency is always the overhead that cannot be ignored. This has been demonstrated in FIG. 13. However the tests in the present disclosure run all robots in one desktop machine, thus computation load, especially the graphic computation of the simulator, and communication load are centralized on one node. Such burdens can be greatly relieved in real robot systems as they do not need so much computation resource for simulation purposes, and communication can be distributed in several Gateways. That means more robots can be effectively controlled by the IoT Cloud. But if the number of robots increases to certain large values like 1000 or more, communication overhead still should be considered carefully.

Lastly, data transmitting delay in the Cloud can also be tricky. As for Storm, currently tasks are distributed by the Nimbus node and cannot be set by program or manually by commands. Therefore connected tasks that distributed in different machines will suffer longer communication delay than those distributed in the same machine. These are the problems that need to be explored in the future.

The present disclosure provides a novel Cloud-based computation framework for Swarm robotics. To demonstrate the viability of the framework for real-time control of large number of robots, a local collision avoidance algorithm is implemented as a Cloud application. Unlike other research work that tries to minimize computation cost by ignoring important real world factors, our setup adopts a complex algorithm that can reflect more details about the real world scenario. These computation-intensive tasks are transferred to the Cloud, so that robots or other intelligent entities can be simplified in both hardware and software. By offloading computation to the IoT Cloud, more complex entities can be studied in Swarm Robotics/Intelligence without trimming off the details of the entity. Such precise implementation of the entity model can lead to deeper insight into swarm characteristics.

By implementing and testing the collision avoidance algorithm on the IoT Cloud platform, scaling and real-time controlling ability of the system is verified. The results demonstrate that by simply scaling the computation resources, one IoT Cloud application can provide service for more robots. Such features will greatly facilitate extending the population in Swarm robotics and also provide support for large-scale Swarm systems.

FIG. 12A shows time consumption for each part of the Control Loop as shown in FIG. 11 with different combinations of NPC (Number of parallelism for Velocity Compute Bolt) and NPS (Number of parallelism for Get Robot State Bolt). FIG. 12B shows time consumption for each part of the Pose Share Loop with different combinations of NPC and NPS.

FIG. 13 shows the overall command delay and the delay caused by computation and communication in the IoT Cloud with different combinations of NPC (Number of parallelism for Velocity Compute Bolt) and NPS (Number of parallelism for Get Robot State Bolt).

IoTCloud Framework

Referring now to FIG. 14, IoTCloud is an open source framework developed at Indiana University to connect IoT devices to cloud services. As shown in FIG. 14, it consists of a set of distributed nodes running close to the devices to gather data, a set of publish-subscribe brokers to relay information to the cloud services, and a distributed stream processing framework (DSPF) coupled with batch processing engines in the cloud to process the data and return (control) information to the IoT devices 102. Applications execute data analytics at the DSPF layer, achieving streaming real-time processing. The IoTCloud platform 100 uses Apache Storm as the DSPF, RabbitMQ or Kafka as the message broker 110, and an OpenStack academic cloud (or bare-metal cluster) as the platform. The present disclosure uses a coordination and discovery service based on ZooKeeper to scale the number of devices.

In general, a real-time application running in a DSPF can be modeled as a directed graph with streams defining the edges and processing tasks defining the nodes. A stream is an unbounded sequence of events flowing through the edges of the graph and each such event consists of a chunk of data. The processing tasks at the nodes consume input streams and produce output streams. A DSPF provides the necessary API and infrastructure to develop and execute applications on a cluster of nodes. In Storm these tasks are called Spouts and Bolts. To connect a device to the cloud services, a user develops a gateway application that connects to the device's data stream. Once an application is deployed in an IoTCloud gateway 108, the cloud applications discover those applications and connect to them for data processing using the discovery service.

Design of Robot Applications

Referring now to FIG. 15, a cloud-based implementation of GMapping for a real robot 102, the TurtleBot by Willow Garage, using the IOTCloud platform 100 is shown. TurtleBot is an off-the-shelf differential drive robot equipped with a Microsoft Kinect sensor. An overview of the implementation is shown in FIG. 15. The application that connects to the ROS-based Turtlebot API is deployed in an IoTCloud Gateway 108 running on a desktop machine, where it subscribes to the TurtleBot's laser scans and odometer readings. It converts the ROS messages to a format that suits the cloud application and sends transformed data to the application running in the FutureSystems OpenStack VMs using the message brokering layer 110. The cloud application generates a map and sends this back to the workstation running the gateway, which saves and publishes it back to ROS for viewing.

RBPF SLAM Algorithm

Assuming a series of laser readings $z_{1:t}=(z_1, \ldots, z_t)$ over time, as well as a set of odometer measurements $u_{1:t-1}=(u_1, \ldots, u_{t-1})$ from the robot. Our goal is to estimate both a map m of the environment and the trajectory of the robot, $x_{1:t}=(x_1, \ldots, x_t)$. For any time t, it can be sampled from the posterior probability, $$p(x_{1:t}, m|z_{1:t}, u_{1:t-1}) = p(x_{1:t}|z_{1:t}, u_{1:t-1})p(m|x_{1:t}, z_{1:t}), \quad (1)$$

by sampling from the first term on the right hand side to produce an estimate of the robot's trajectory given just the observable variables, and then sample from the second term to produce an estimate of the map using that sampled trajectory. The particle filter maintains a set of particles, each including a possible map of the environment and a possible trajectory of the robot, along with a weight which can be thought of as a confidence measure. A standard implementation of the algorithm executes the following steps for each particle i as follows:

1. Make an initial estimate of the position of the robot at time t, using the estimated position at time t−1 and odometry measurements, i.e.

$$x'^i_t = x'^i_{t-1} \oplus u_{t-1}$$

where ⊕ is a pose compounding operator. The algorithm also incorporates the motion model of the robot when computing this estimate.

2. Use the ScanMatching algorithm shown in Algorithm 1 with cutoff of ∞ to refine $x'^i_t$ using the map $m^i_{t-1}$ and laser reading $z_t$. If the ScanMatching fails, use the previous estimate.

3. Update the weight of the particle.

4. The map $m^i_t$ of the particle is updated with the new position $x^i_t$ and $z_t$.

---

Algorithm 1: Scan Matching input : pose u and laser reading z
output: bestPose and l
1  steps ← 0; l ← −∞; bestPose ← u; delta ← InitDelta;
2  currentL ← likelihood (u, z);
3  for i ← 1 to nRefinements do
4      delta ← delta/2;
5      repeat
6          pose ← bestPose; l ← currentL;
7          for d ← 1 to K do
8              xd ← deterministicsample(pose, delta);
9              localL ← likelihood (xd, z);
10             steps+ = 1;
11             if currentL < localL then
12                 currentL ← localL; bestPose ← xd;

-continued

Algorithm 1: Scan Matching

```
13      end
14    end
15  until l < currentL and steps < cutoff;
16 end
```

After updating each particle, the algorithm normalizes the weights of all particles based on the total sum of squared weights, and then resamples by drawing particles with replacement with probability proportional to the weights. Resam-pled particles are used with the next reading. At each reading the algorithm takes the map associated with the particle of highest weight as the correct map. The computation time of the algorithm depends on the number of particles and the number of points in the distance reading. In general the accuracy of the algorithm improves if more particles are used.

Streaming Parallel Algorithm Design

Figure 16:
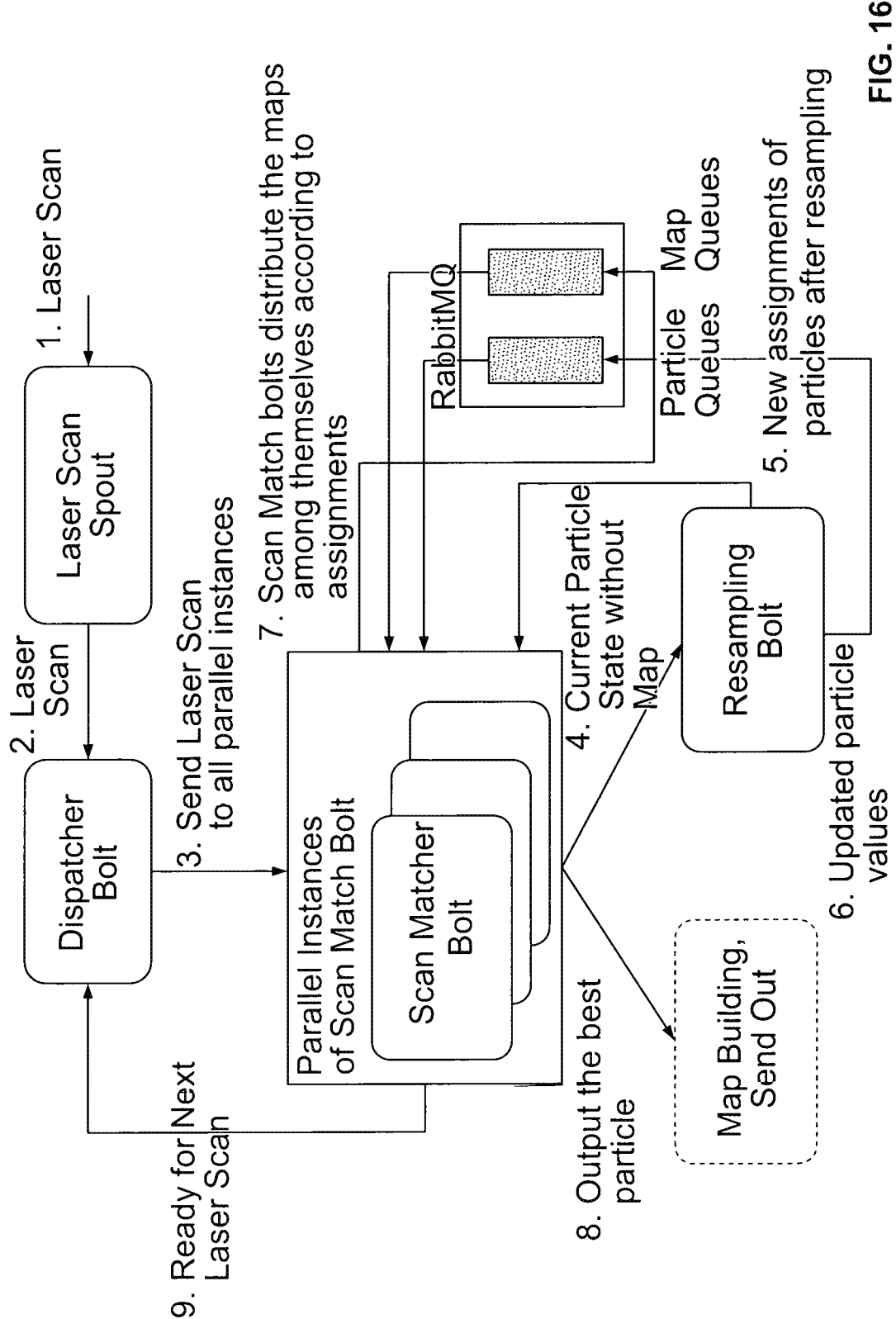
FIG. 16 is a schematic block diagram of an exemplary storm streaming workflow for parallel RBPF SLAM.

Referring now to FIG. 16, it is found that RBPF SLAM spends nearly 98% of its computation time on Scan Matching. Because Scan Matching is done for each particle independently, in a distributed environment the particles can be partitioned into different computation nodes and computed in parallel. However, the resampling step requires information about all particles so it needs to be executed serially, after gathering results from the parallel computations. Resampling also removes and duplicates some particles, which means that some particles have to be redistributed to different nodes after resampling.

Our stream workflow of the algorithm is shown in FIG. 16, implemented as an Apache Storm topology. The topology defines the data flow graph of the application with Java-based task implementations at the nodes and communication links defining the edges. The different components of this workflow run in a cluster of nodes in the cloud. The main tasks of the algorithm are divided into ScanMatcher-Bolt and ReSamplingBolt. The LaserScanBolt receives data from the robot and sends it to the rest of the application. After computation, results are passed to SendOut bolts which send it back to the robot. If required, data can be saved to persistent storage as well.

A key idea behind our implementation is to distribute the particles across a set of tasks running in parallel. This particle-specific code is encapsulated in the ScanMatcher bolt, so the present disclosure can control the parallelism of the algorithm by changing the number of ScanMatcher bolt instances. The Resampling bolt must wait until it receives the results of the ScanMatcher bolts. After a resampling happens, the algorithm removes some existing particles and duplicate others, so the assignments of particles to Scan-Matcher tasks have to be rearranged. The directed communication required among the parallel ScanMatcher tasks to do the reassignment is not well supported by Apache Storm, so the present disclosure uses an external RabbitMQ message broker. All the data flowing through the various communication channels are in a byte format serialized by Kryo. The steps for a single reading as shown in FIG. 16 are:

1. LaserScan spout receives laser and odometer readings via the message broker.
2. The reading is sent to a Dispatcher, which broadcasts it to the parallel tasks.
3. Each ScanMatcher task receives the laser reading, updates its assigned particles, and sends the updated values to the Resampling bolt.
4. After resampling, the Resampling bolt calculates new particle assignments for the ScanMatchers, using the Hungarian algorithm to consider relocation costs. The new particle assignment is broadcast to all the ScanMatchers.
5. In parallel to Step 4, the Resampling bolt sends the resampled particle values to their new destinations according to the assignment.
6. After ScanMatchers receive new assignments, they distribute the maps associated with the resampled particles to the correct destinations, using RabbitMQ queues to send messages directly to tasks.
7. The ScanMatcher with the best particle outputs its values and the map.
8. ScanMatcher bolts send messages to the dispatcher, indicating their willingness to accept the next reading.

Our implementation exploits the algorithm's ability to lose readings by dropping messages that arrive at a Dispatcher bolt while a computation is ongoing, to avoid memory overflow. Owing to the design of the GMapping algorithm, only a few resampling steps are needed during map building. If resampling does not happen then steps 5 and 6 are omitted. Although an open source serial version of the algorithm in C++ is available through OpenSlam, it is not suitable for our platform which requires Java. The algorithm described above was implemented in Java and is available in github along with steps to run the experiments.

Results and Discussion

Figure 17:
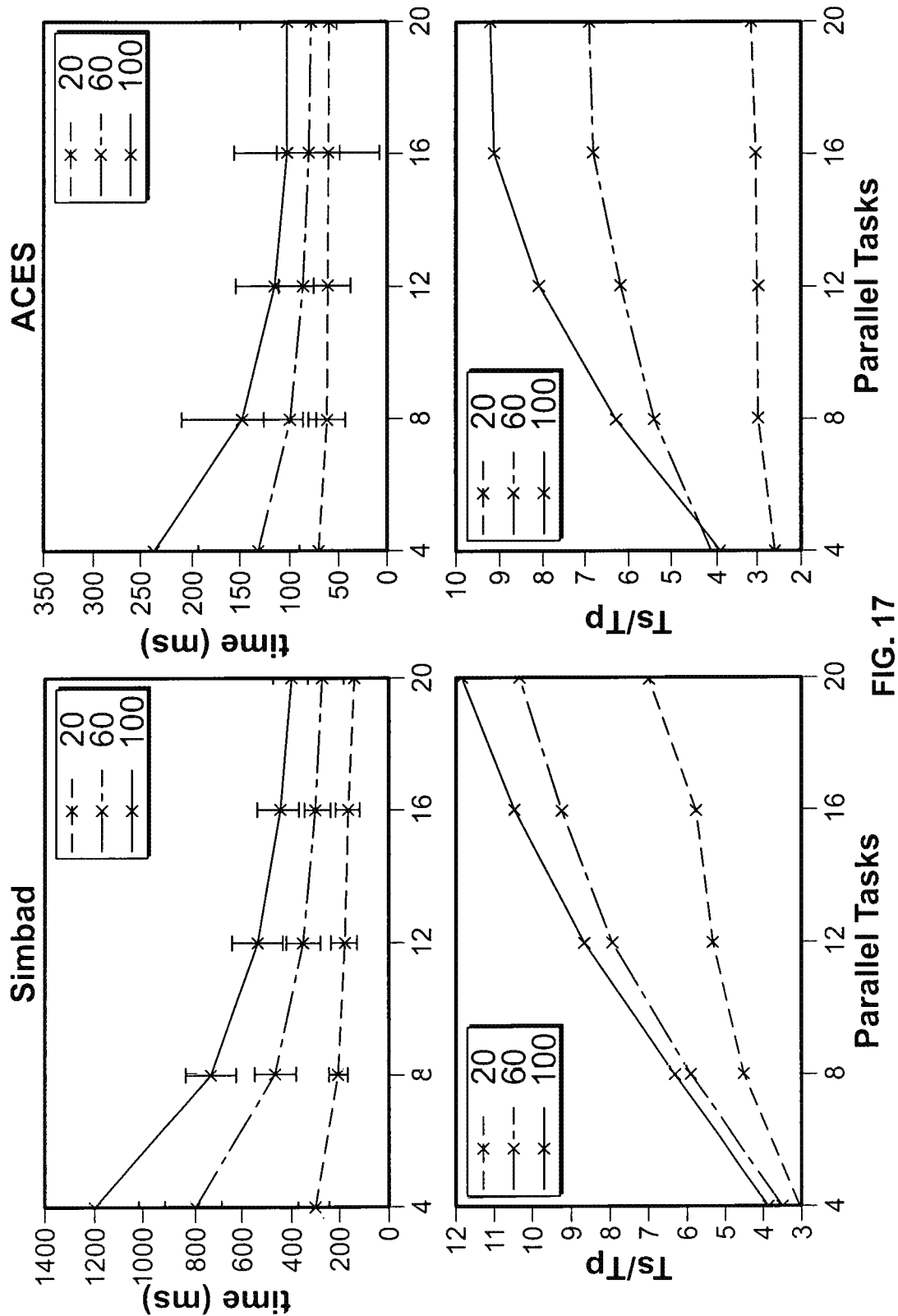
FIG. 17 is a graphical representation of an exemplary parallel behavior of the algorithm for Simbad and ACES datasets.
Figure 23:
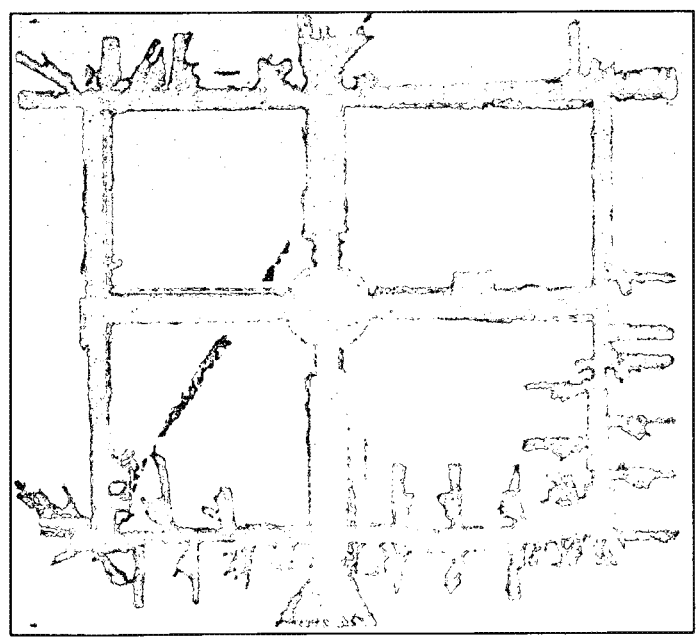
FIG. 23 is an exemplary visualization of a map of ACES.

Referring now to FIGS. 17 and 23, the goal of our experiments was to verify the correctness and practical feasibility of our approach, as well as to measure its scalability. All experiments ran in FutureSystems OpenStack VMs each having 8 GB memory and 4 CPU cores running at 2.8 GHz. Our setup had 5 VMs for Apache Storm Workers, 1 VM for RabbitMQ and 1 VM for ZooKeeper and Storm master (Nimbus) node. For all the tests the gateway node was running in another VM in FutureSystems. Each Storm worker instance ran 4 Storm worker processes with 1.5 GB of memory allocated. The present disclosure uses the ACES building data set and a small environment generated by the Simbad robot simulator for our experiments. ACES has 180 distance measurements per laser reading and Simbad has 640 measurements per laser reading. For the ACES dataset the present disclosure uses a map of size 80×80 m with 0.05 resolution, and for Simbad the map was 30×30 m with 0.05 resolution.

FIG. 23 shows a sample result from ACES. Since GMapping is a well-studied algorithm, this test is mainly focused on the parallel behavior of our implementation. Parallel speedup is measured (defined as serial time over parallel time, i.e. $T_s/T_p$) by recording the time required to compute each laser reading and then taking an average. The algorithm is tested with 20, 60 and 100 particles for each dataset. The serial time was measured on a single FutureSystems machine, as shown in Table 3, and the parallel times were measured with 4, 8, 12, 16 and 20 parallel tasks.

TABLE 3

Serial average time (in ms) for different datasets and numbers of particles.

| Data set | Particle count | | |
|---|---|---|---|
| | 20 | 60 | 100 |
| Simbad | 987.8 | 2778.7 | 4633.84 |
| Simbad, ScanMatching Cutoff = 140 | 792.86 | 2391.4 | 4008.7 |
| ACES | 180 | 537 | 927.2 |

The parallel speedups gained for the ACES and Simbad datasets are shown in FIG. 17. For ACES, the number of points per reading is relatively low, requiring relatively little computation at the ScanMatcher bolts, which results in only a modest parallel speedup after 12 particles. On the other hand, Simbad has about 4 times more distance measurements per reading and produces higher speed gains of about a factor of 12 for 20 parallel tasks with 100 particles. While not directly comparable because we test on different datasets with different resources, our parallel speed-ups are significantly higher than conventional systems, e.g. up to 12× compared with up to about 2.6×, illustrating the advantage of implementing in a distributed memory cloud versus the single node.

Figure 18A:
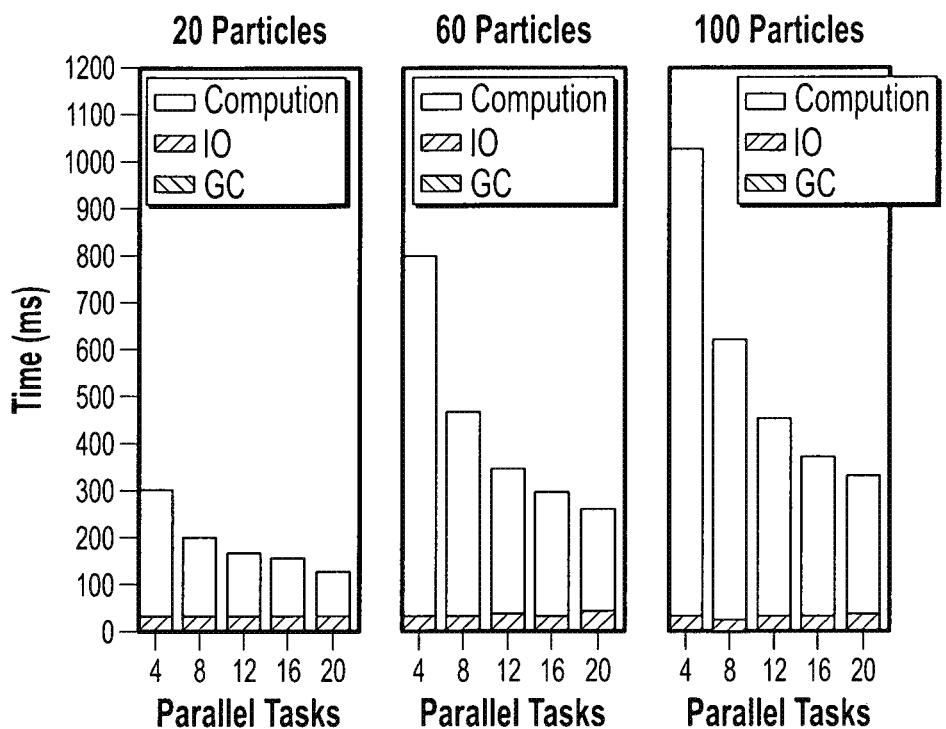
FIGS. 18A-18B illustrate a graphical representation of an exemplary overhead on the Simbad dataset.
Figure 18B:
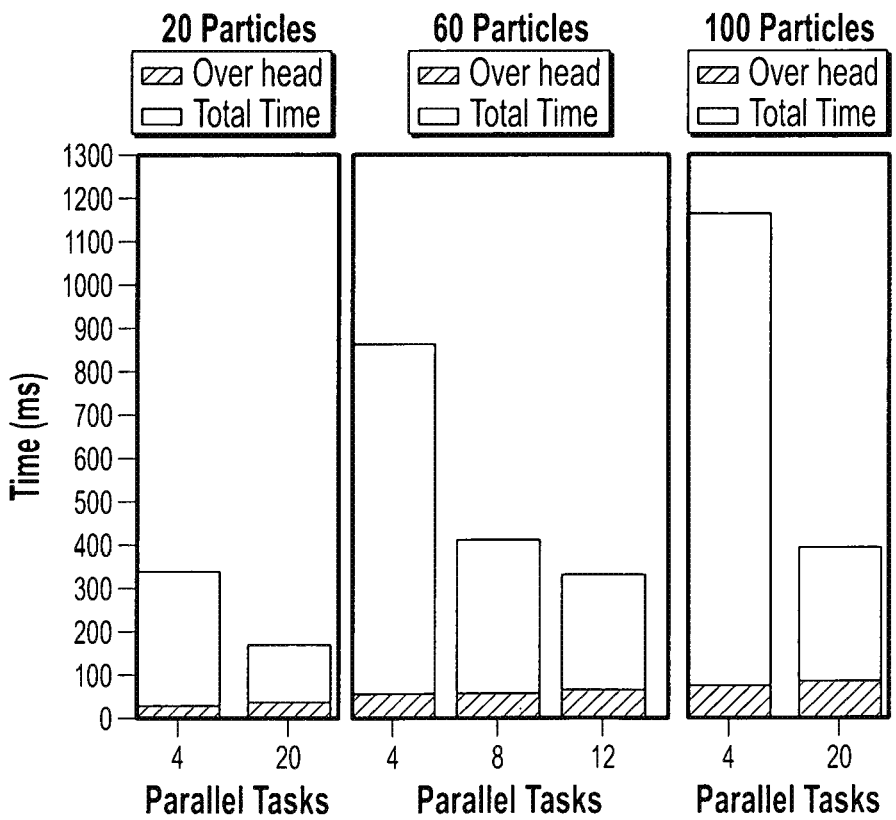

Referring now to FIGS. 18A-B, however, ideally the parallel speedup should be close to 20 with 20 parallel tasks, so we investigated factors that could be limiting the speedup. FIG. 18A shows I/O, garbage collection, and computation times for different parallel tasks and particle sizes. The main culprit for limiting the parallel speedup appears to be I/O: when the number of parallel tasks increases, the compute time decreases, but because of I/O overhead the speedup also decreases. The average garbage collection time was negligible, although we have seen instances where it increases the individual computation times. Additionally, the resampling step of the algorithm is done serially, although since this is relatively inexpensive compared with Scan Matching, it is not a significant source of speedup loss.

Another factor that affects parallel speedup is the difference in computation times among parallel tasks. Assume we have n ScanMatcher tasks taking $t_1, \ldots, t_m, \ldots, t_n$, seconds, where $t_m$ is the maximum among these times. In the serial case, the total time for ScanMatching is $T_s = t_1 + \ldots + t_m + \ldots + t_n$, while for the parallel case it is at least tm because Resampling has to wait for all parallel tasks to complete. The overhead introduced because of this time imbalance is $t_{overhead} = t_m - T_s/n$, which is 0 in the ideal case when all tasks take the same time. FIG. 18B shows the average overhead for the Simbad dataset compared with the total time. The average overhead remained almost constant while the total time decreased with more parallel tasks, restricting the speedup.

FIG. 17 shows parallel behavior of the algorithm for the Simbad dataset with 640 laser readings (left) and the ACES dataset with 180 readings (right). For each dataset, the top graph shows mean times with standard deviations and the bottom graph shows the speedup.

FIGS. 18A-18B show overhead on the Simbad dataset: (a) I/O, garbage collection, and Compute time. (b) Overhead of imbalanced parallel computation.

To further investigate the behavior of the algorithm, we plotted the computation times for each reading, as shown in FIGS. 6a and 6b. There are high peaks in the individual times in both serial and parallel algorithms. This is caused by the while loop ending in line 5 of Algorithm 1, which can execute an arbitrary number of times if the cutoff is Co. We have observed a mean of about 150 and standard deviation around 50 for number steps executed by the ScanMatching algorithm for Simbad, although sometimes it is as much as 2 to 3 times the average. This is especially problematic for the parallel case because even one particle can significantly increase the response time. An advantage of nondeterministic particle-based algorithms is that if there are a sufficiently large number of particles, cutting off the optimization for a few of them prematurely does not typically affect the results, and we can easily increase the number of particles if needed to compensate for these premature cutoffs. We also observed that these large numbers of steps typically occur at later refinements with small delta values, where the corrections gained by executing many iterations is usually small.

Referring now to FIGS. 19-22, we thus changed the original algorithm shown in Algorithm 1 to have a configurable cutoff for the number of steps and performed experiments by setting the maximum number of steps to 140, which is close to the empirical average. We found that maps built by this modified algorithm were of comparable quality to the originals. The resulting time variations for two tests are shown in FIG. 19C. Here we no longer see as many large peaks as in FIG. 19B, and the remaining peaks are due to minor garbage collection.

Figure 20:
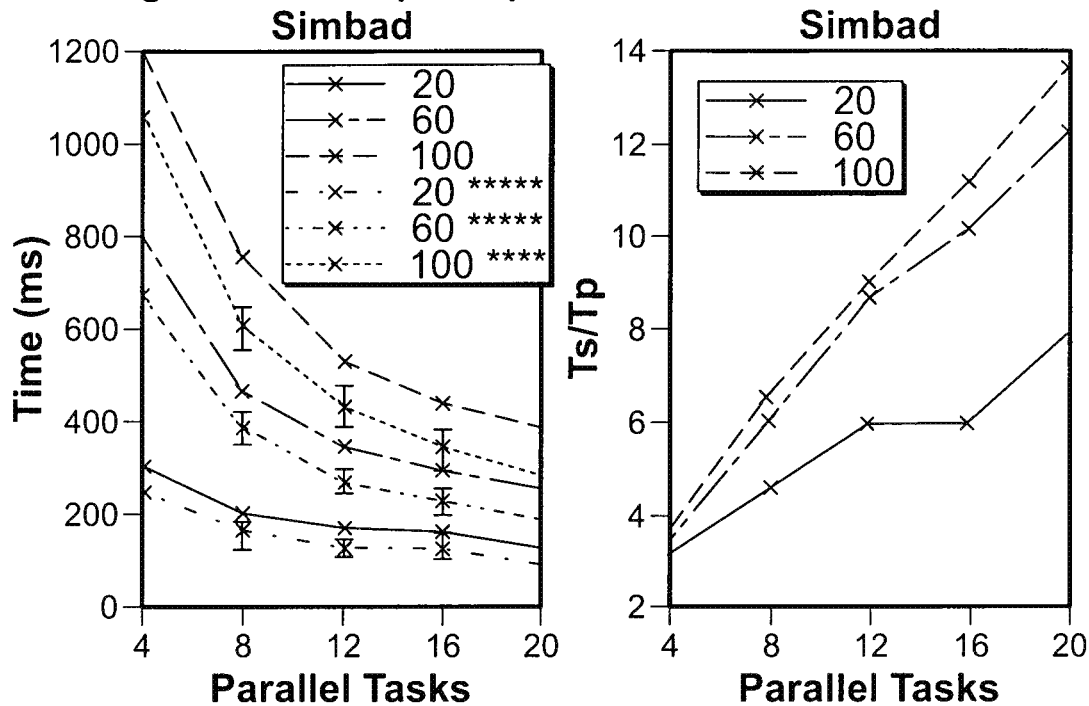
FIG. 20 is a graphical representation of an exemplary average time and speedup for Simbad with cutoff at 140.
Figure 22:
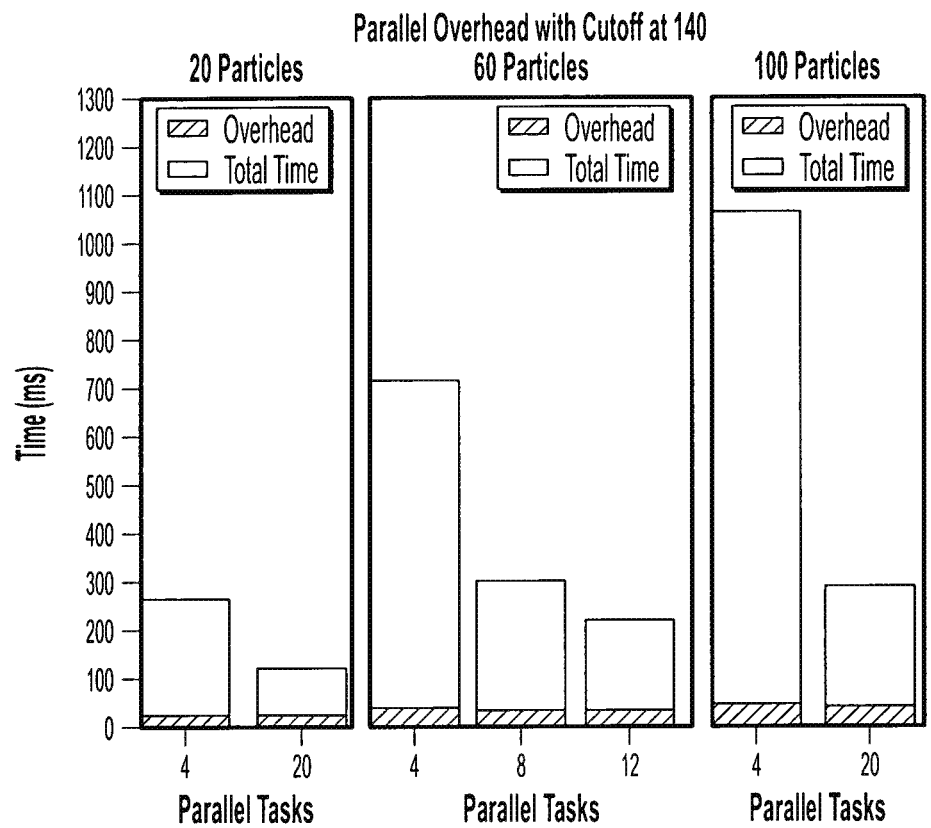
FIG. 22 is a graphical representation of an exemplary parallel overhead with cutoff at 140.

FIG. 20 shows the average time reduction and speedup after the cutoff. As expected, we see an improvement in speedup as well, because the parallel overhead is now reduced as shown in FIG. 22 after cutoff at 140 steps. This shows that cutoff is an important configuration parameter that can be tuned to balance performance and correctness.

Figure 21:
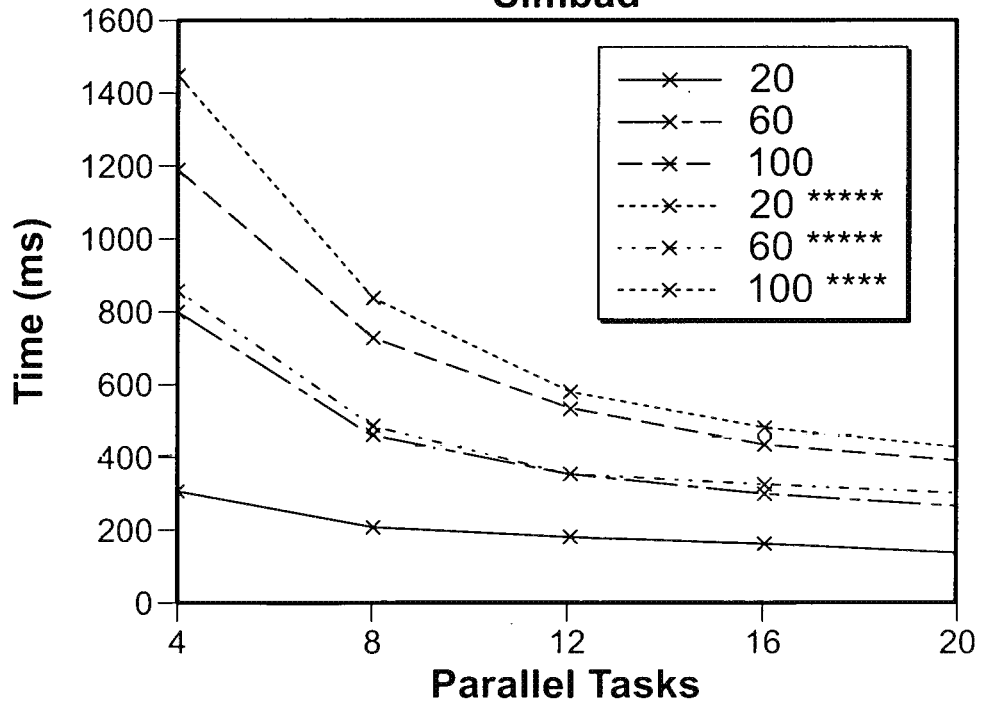
FIG. 21 is a graphical representation of an exemplary resampling overhead with Simbad.

FIG. 21 presents the difference in calculations when we conducted the resampling step for every reading with the Simbad dataset. When the number of particles is high, the overhead is large. When we have more parallel workers, the map distribution happens simultaneously using more nodes, which reduces the I/O time. The original serial algorithm for Turtlebot runs every 5 seconds. Because the parallel algorithm runs much faster than the serial version, it can be used to build a map for a fast-moving robot. In particle filtering-based methods, the time required for the computation increases with the number of particles. By distributing the particles across machines, an application can utilize a high number of particles, improving the accuracy of the algorithm.

The present disclosure has shown how to offload robotics data processing to the cloud through a generic real-time parallel computation framework, and our results show significant performance gains. Because the algorithm runs on a distributed cloud, it has access to potentially unbounded memory and CPU power. This allows the system to scale well, and for example could build maps in large, complex environments needing a large number of particles or dense laser readings.

There are many possible enhancements to our system. The present disclosure addressed the problem of imbalances in particle computation times by simply discarding particles that exceed a hard computation limit, which works well for this particular algorithm but may not for others. Also we have observed fluctuations in processing time caused by virtualization, multi-stream interference and garbage collection. In the future we would like to address these fluctuations with a generic approach such as running duplicate computation tasks. Also, it is observed that result broadcast and gathering in the streaming tasks takes considerable time, so reducing I/O would also significantly improve performance.

Reducing programming complexity is also an interesting direction. Modern distributed stream processing engines expose low-level APIs, making developing intricate IoT applications quite complex. Future work should propose higher-level APIs to handle complex interactions by abstracting out the details. Distributing state between parallel workers currently requires a third node, such as an external broker or a streaming task acting as an intermediary. A group communication API between the parallel tasks would be a worthy addition to DSPF. Extending our work to abstract out a generic API to quickly develop any particle filtering algorithm would also be interesting.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method of operating in parallel a plurality of heterogenous robots using a cluster of nodes in a network, the method comprising:
   receiving, using a gateway cloud driver, robot state information from a given robot of the plurality of heterogenous robots via the network;
   converting, using the gateway cloud driver, the robot state information into at least one message;
   transmitting, using a message broker, the at least one message to the cluster of nodes via the network;
   processing, using the cluster of nodes in the network, the at least one message by parallel computing, the processing being carried out in parallel with the processing of at least one message for at least one other robot of the plurality of heterogenous robots; and
   generating, using the cluster of nodes in the network, a robot command to control the operation of the given robot.

2. The method of claim 1, further comprising including, in the robot state information, at least one of: odometry information, scan information, and pose information associated with the robot.

3. The method of claim 1, further comprising converting the robot state information into one or more custom-defined data types that can be processed by the message broker and the cluster of nodes.

4. The method of claim 1, further comprising defining, using the gateway cloud driver, at least one cloud channel between the gateway cloud driver and the message broker for transmitting the at least one message to the cluster of nodes.

5. The method of claim 4, wherein defining the at least one cloud channel comprise creating the at least one cloud channel based on a type of the robot state information.

6. The method of claim 5, wherein at least one message pertaining to robot state information of the same type for the at least one other robot of the plurality of robots is also transmitted over the cloud channel.

7. The method of claim 6, wherein each message pertaining to the robot state information of the same type is tagged with an identifier of the robot associated to the message.

8. The method of claim 1, wherein the at least one message of the given robot and the at least one message for the at least one other robot is processed by parallel computing in real time using the cluster of nodes in the network.

9. The method of claim 8, wherein performing the processing of the at least one message by parallel computing in real time comprises performing a scan matching process associated with the robot in parallel.

10. The method of claim 1, further comprising including, in the robot command, a motion command generated based on velocity obstacle information.

11. The method of claim 10, wherein including the motion command generated based on the velocity obstacle information comprises publishing the motion command having at least one of: velocity information and pose information.

12. The method of claim 1, further comprising converting the robot command into a robot operation system (ROS) message, and transmitting the ROS message to the robot using the gateway cloud driver to control the operation of the robot.

13. The method of claim 1, wherein the robot state information is generated by a device of the given robot and is in a format native to the device;
   wherein the gateway cloud driver applies a device driver to convert the robot state information in the native format to the at least one message.

14. The method of claim 13, wherein the converted message is processable by the cluster node independently of the format of the robot state information native to the device.

15. The method of claim 14, wherein the heterogenous robots form a swarm of robots.

16. The method of claim 15, wherein the robot state information comprises at least one of odometry information, scan information, and pose information associated with the robot; and
   wherein the at least one message for the given robot is processed to avoid collision with any other one of the robots forming the swarm.

17. The method of claim 1, wherein the robot state information is generated by a first device of the given robot;
   wherein the gateway cloud driver applies a first device driver to convert the robot state information; and
   wherein the at least one message for the at least one other robot is generated by converting robot state information received from a second device of the at least one other robot using a second device driver of the gateway cloud driver, the first device being different from the second device and the first device driver being different from the second device driver.

18. The method of claim 1, wherein the robot state information is generated by a first device of the given robot;
   wherein the gateway cloud driver applies a device driver to convert the robot state information; and
   wherein the at least one message for the at least one other robot is generated by converting robot state information received from a second device of the at least one other robot, the first device being of the same type as the second device, and the device driver converting both the robot state information from the given robot and the robot state information received from the at least one other robot.

19. A system of controlling operation of a plurality of heterogenous robots using a cluster of nodes in a network, comprising:
   a gateway cloud driver configured to receive robot state information from a given robot of the plurality of heterogenous robots via the network, and configured to convert the robot state information into at least one message;
   a message broker configured to communicate the at least one message between the cluster of nodes and the gateway cloud driver via the network; and
   wherein the cluster of nodes in the network is configured to:
   process the at least one message by parallel computing, the processing being carried out in parallel with the processing of at least one message for at least one other robot of the plurality of heterogenous robots; and
   generate a robot command to control the operation of the given robot.

20. The system of claim 19, wherein the robot state information includes, at least one of: odometry information, scan information, and pose information associated with the robot.

21. The system of claim 19, wherein the gateway cloud driver is configured to convert the robot state information into one or more custom-defined data types that can be processed by the message broker and the cluster of nodes.

22. The system of claim 19, wherein the gateway cloud driver is configured to define at least one cloud channel between the gateway cloud driver and the message broker for transmitting the at least one message to the cluster of nodes.

23. The system of claim 22, wherein the gateway cloud driver is configured to create the at least one cloud channel based on a type of the robot state information.

24. The system of claim 23, wherein at least one message pertaining to robot state information of the same type for the at least one other robot of the plurality of robots is also transmitted by the gateway cloud driver over the cloud channel.

25. The system of claim 24, wherein each message pertaining to the robot state information of the same type is tagged with an identifier of the robot associated to the message.

26. The system of claim 19, wherein the cluster of nodes in the network is configured to perform the processing of the at least one message by parallel computing in real time.

27. The system of claim 26, wherein the cluster of nodes in the network is configured to perform a scan matching process associated with the robot in parallel.

28. The system of claim 19, wherein the cluster of nodes in the network is configured to generate a motion command, as a part of the robot command, based on velocity obstacle information.

29. The system of claim 28, wherein the cluster of nodes in the network is configured to publish the motion command having at least one of: velocity information and pose information.

30. The system of claim 19, wherein the gateway cloud driver is configured to convert the robot command into a robot operation system (ROS) message, and transmit the ROS message to the robot to control the operation of the robot.

31. The system of claim 19, wherein the robot state information is generated by a device of the given robot and is in a format native to the device;
  wherein the gateway cloud driver applies a device driver to convert the robot state information in the native format to the at least one message.

32. The system of claim 31, wherein the converted message is processable by the cluster node independently of the format of the robot state information native to the device.

33. The system of claim 32, wherein the heterogenous robots form a swarm of robots.

34. The system of claim 33, wherein the robot state information comprises at least one of odometry information, scan information, and pose information associated with the robot; and
  wherein the at least one message for the given robot is processed to avoid collision with any other one of the robots forming the swarm.

35. The system of claim 19, wherein the robot state information is generated by a first device of the given robot;
  wherein the gateway cloud driver applies a first device driver to convert the robot state information; and
  wherein the at least one message for the at least one other robot is generated by converting robot state information received from a second device of the at least one other robot using a second device driver of the gateway cloud driver, the first device being different from the second device and the first device driver being different from the second device driver.

36. The system of claim 19, wherein the robot state information is generated by a first device of the given robot;
  wherein the gateway cloud driver applies a device driver to convert the robot state information; and
  wherein the at least one message for the at least one other robot is generated by converting robot state information received from a second device of the at least one other robot, the first device being of the same type as the second device, and the device driver converting both the robot state information from the given robot and the robot state information received from the at least one other robot.

* * * * *